United States Patent [19]

Inokuchi et al.

[11] Patent Number: 5,559,778
[45] Date of Patent: Sep. 24, 1996

[54] APPARATUS AND METHOD FOR COMPLETING AN INCOMPLETE RECORDING ON AN OPTICAL DISC

[75] Inventors: Tatsuya Inokuchi, Kanagawa; Shigeki Tsukatani, Tokyo; Tadayuki Misaizu, Kanagawa, all of Japan

[73] Assignee: Sony Corporation, Tokyo, Japan

[21] Appl. No.: 365,098

[22] Filed: Dec. 28, 1994

[30] Foreign Application Priority Data

Dec. 28, 1993 [JP] Japan .................................. 5-349649

[51] Int. Cl.$^6$ ........................................................ G11B 7/00
[52] U.S. Cl. ................... 369/58; 369/54; 369/47; 369/59
[58] Field of Search ................................. 369/47, 48, 50, 369/49, 54, 53, 58, 59, 60

[56] References Cited

U.S. PATENT DOCUMENTS 5,177,720  1/1993  Kondo ........................ 369/48
5,212,678  5/1993  Roth et al. .................... 369/60

Primary Examiner—Georgia Y. Epps
Assistant Examiner—Muhammad N. Edun
Attorney, Agent, or Firm—Limbach & Limbach L.L.P.

[57] ABSTRACT

When a previous recording of data on a write-once optical disc is incomplete, the previous recording is processed to enable it to be read, and to enable additional data to be recordable on the write-once optical disc following the incomplete previous recording. The previous recording, when incomplete, lacks at least an end portion that would be included in the previous recording when complete. The previous recording is tested to determine whether it is incomplete. When the previous recording is detected as being incomplete, the position of the end of the previous recording is determined, a pseudo signal is generated for recording on the write-once optical disc, and the pseudo signal is written on the write-once optical disc, starting at the previously-determined position of the end of the previous recording. Writing the pseudo signal appends to the previous recording an additional recording that includes a replacement for the end portion lacking from the incomplete previous recording.

30 Claims, 13 Drawing Sheets

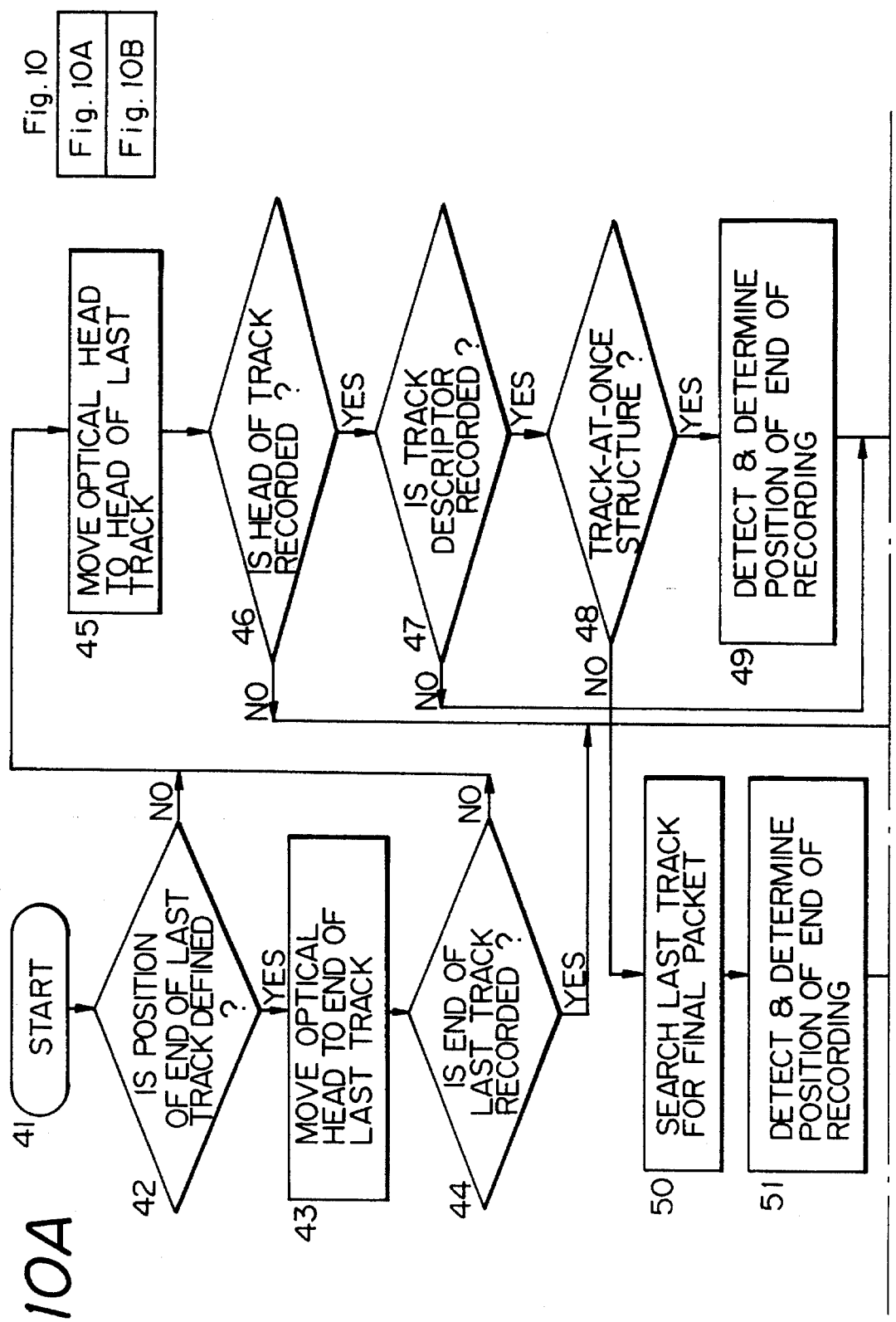

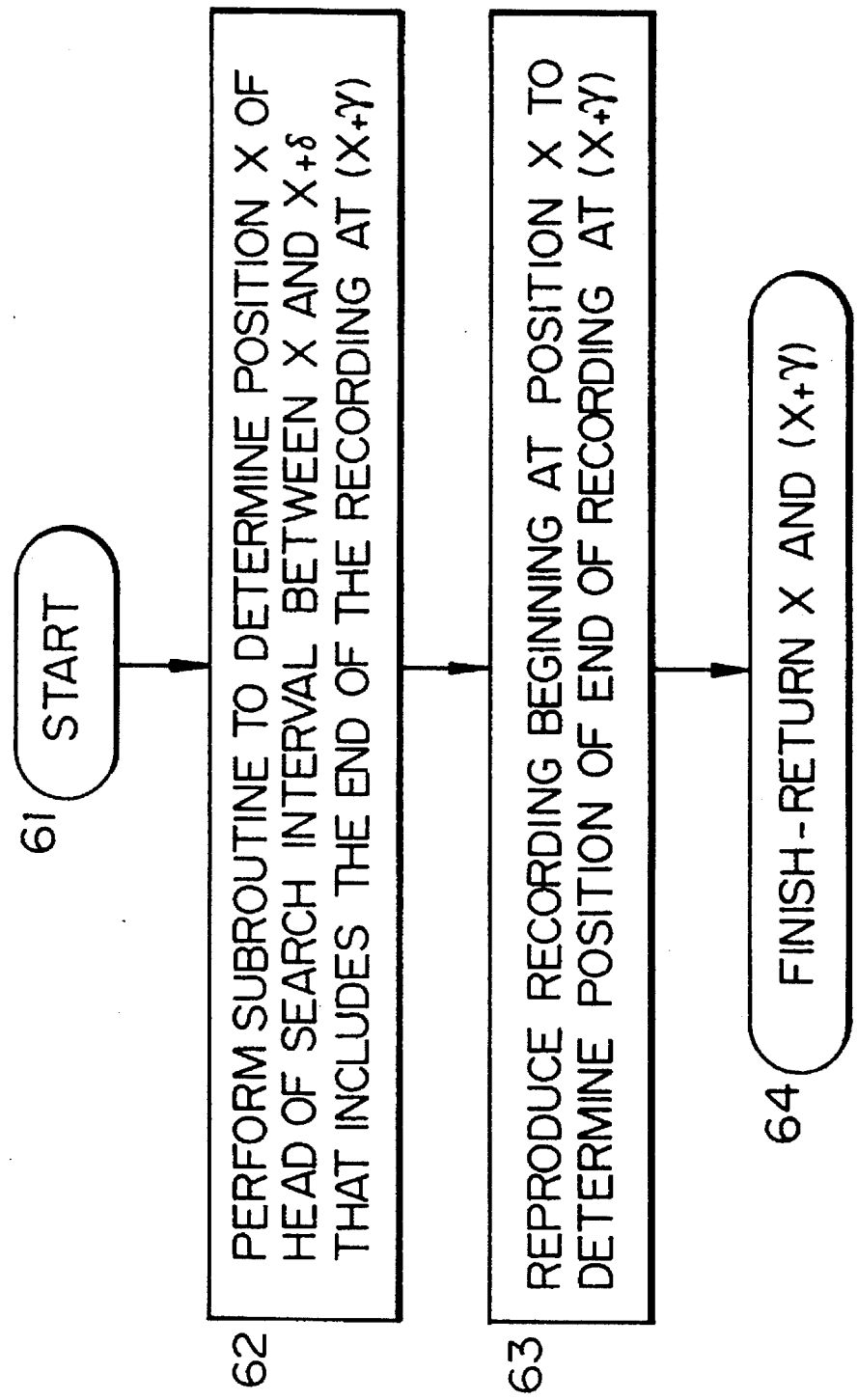

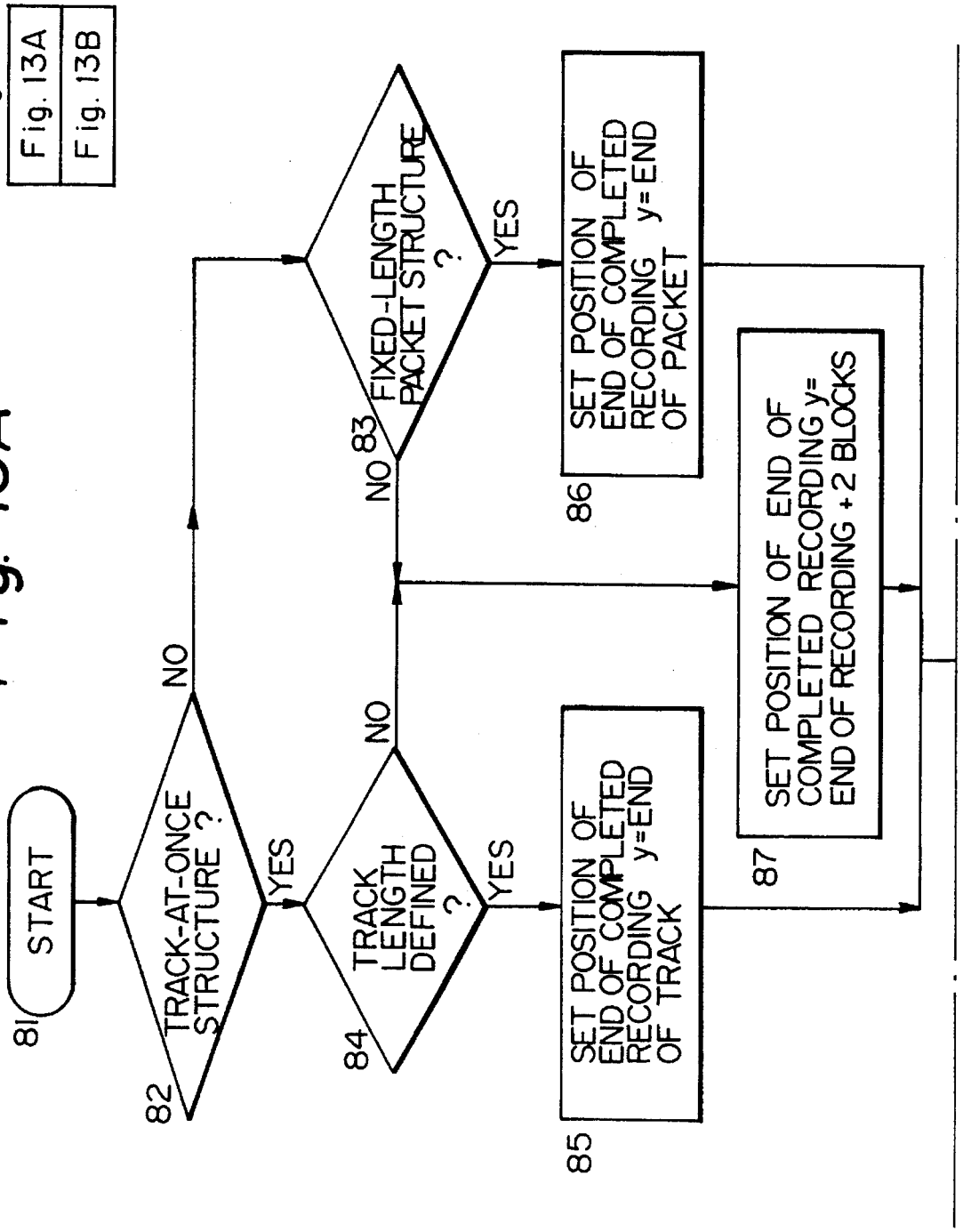

APPARATUS AND METHOD FOR COMPLETING AN INCOMPLETE RECORDING ON AN OPTICAL DISC

FIELD OF THE INVENTION

The invention relates to an optical disc apparatus which can record data onto an optical disc and a method for using an optical disc apparatus.

BACKGROUND OF THE INVENTION

Optical discs, called CD-R, that can be written once and read many times are known. A CD-R is formed by depositing a layer of an organic pigment on a disc-shaped substrate of, for example, polycarbonate, to provide a recording surface. The recording surface is then protected by a protective layer. The optical disc apparatus writes data on the CD-R by intermittently illuminating the recording surface using a light beam. The light beam thermally changes the organic pigment of the recording surface to form regions of low reflectance on the recording surface corresponding to the state of the bits of the recorded data.

The data structure of the data recorded on a CD-R will now be described. FIG. 1 shows the data structure in the inner-rim portion of the CD-R. This portion covers addresses in the range 00:00:00 to 00:35:36 between the inner rim and the lead-in region. The addresses are expressed as absolute times in the format ((minutes):(seconds):(frames)). Each frame has a duration of 1/75 second, as in a conventional CD-ROM. The CD-R also includes a wobbling groove to facilitate tracking of the optical head during recording and reproduction. Absolute time (ATIP) codes are pre-recorded at intervals along the length of the wobbling groove by frequency modulating the wobbling groove. In other words, absolute addresses are pre-recorded along the wobbling groove pre-formed in the CD-R.

In FIG. 1, reference numeral 101 denotes the light intensity adjusting region (PCA). The PCA 101 is divided into a test region 102 for adjusting the intensity of the light beam used for recording, and the count region 103 in which data indicating the number of times the test region 102 has been used is recorded. The test region 102 occupies the address range (00:15:35 to 00:35:35), namely, 1500 frames. The count region 103 occupies the address range (00:13:55 to 00:15:05), namely, 100 frames.

The test region 102 is divided into 100 regions (called partitions) 104. Each partition has a length of 15 frames. The count region 103 is also divided into 100 regions (also called partitions) 104. Each partition of the count region 103 corresponds to a partition of the test region 102.

To adjust the intensity of the light beam for recording to the optimum value, a test pattern, in which the light intensity gradually decreases from the maximum intensity, is recorded in the one of the partitions 104 of the test region 102. When the test pattern has been recorded in one of the partitions 104 of the test region 102, a recorded mark is written into the partition of the count region 103 corresponding to the partition of the test region 102. Since there is a one-to-one correspondence between the partitions of the count region 103 and the partitions of the test region 102, it is possible to determine whether a certain partition of the test region has previously been used for testing purposes (and is therefore no longer available for use) by examining the partition of the count region 103 corresponding to the partition of the test region. FIG. 1 shows an example in which the first through third partitions of the test region 102 have been used, as indicated by the marks written in the first through third partitions of the count region 103.

Reference numeral 105 denotes the program memory region (PMA), which has a size of 50 frames. Disc identification information and data indication the portions of the disc that have been used for recording are recorded in the PMA 105, namely, the PMA functions as a temporary memory. Data indicating the length of each recording track may also be recorded in the program memory region, as will be described in more detail below.

The hierarchical data structure by which data are recorded in the user region of the CD-R, immediately following the PMA, will now be described with reference to FIGS. 2A–2D. The data structure of the CD-R as a whole is shown in FIG. 2A. Reference numeral 91 denotes the largest data unit in which user data are recorded. This largest data unit is called a session and is the amount of user data recorded at one time. The data structure of the CD-R as a whole therefore consists of the PCA 101, PMA 105, and one or more sessions 91.

FIG. 2A also shows the large-scale structure of the session 91 as an example of the structure of the sessions recorded on the CD-R. The session 91 consists of the program region 92 sandwiched between the lead-in region 93 and the lead-out region 94.

FIG. 2B shows the data structure of a session in more detail. The structure of the session 91 is shown as an example. The session begins with the lead-in region 93, and ends with the lead-out region 94. Sandwiched between the lead-in region 93 and the lead-out region 94 is the program region 92, which is divided into a number of tracks, including the track 95, in accordance with the number of data to be recorded. Each of the tracks is given a track number TNO. In the example shown, the session 91 consists of three tracks, with track numbers 01, 02 and 03. Each track identified by a track number TNO consists of two regions 1 and 2 which are distinguished by an index.

FIG. 2C shows the data structure of the track 95 with the track number TNO=01 in more detail. The track is divided into the region 1 and the region 2. The region 1 has the index 00, and has the track descriptor of the track recorded therein. The region 2, which has the index 01, is the recording region in which user data are recorded in units called packets, including the packet 3. User data may be recorded in the region 2 in one of three possible data structures, namely, a track-at-once structure, a fixed-length packet structure, and the variable-length packet structure. The three data structures will be described in more detail below with reference to FIGS. 3–5. Any one of the three data structures x-ray be selected for each track. The track descriptor recorded in the region 1 of each track includes information that indicates data structure of the track.

As an example, FIGS. 2C and 2D show a fixed-length packet data structure, in which the track consists of a number of fixed-length packets, each with a fixed length (a "packet length") of 32 blocks.

FIG. 2D shows the data structure of the packet 3 in more detail. The link block region 5 is located at the head of the packet 3. The link block region 5 forms a connecting portion together with the run-out region 7P of the preceding packet and the run-in region 6. The user data region 8, sandwiched between the run-in region 6 and the run-out region 7, consists of 32 blocks in the fixed-length packet structure shown in this example. The run-in region 6 and run-out region 7 are guard regions in which no data can be recorded on account of the construction of the error correction code of the optical disc. The error correction code may be, e.g., a cross-interleaved Reed-Solomon code.

When additional data are to be recorded on a CD-R optical disc on which one or more previous recordings of data exist, the additional data have to be continuously recorded in a predetermined region of the optical disc. As a fundamental rule, when additional data are recorded on a CD-R disc on which a previous recording of data exists, the additional data must be continuously recorded in the region of the disc immediately following the outer-most part of the disc occupied by the previous recording.

However, it is possible for the recording operation by which the previous recording was made on the optical disc to terminate prematurely leaving the previous recording incomplete. Such a premature termination of the recording process could occur, for example, when the power source is turned off during the recording, or when a servo control error occurs due to a mechanical disturbance or the like. An incomplete recording may lack, for example, the run-out region of a packet, and/or the lead-out region of a session. Moreover, the recording may not occupy the whole of the track length written in the track descriptor of the track and/or the PMA of the disc.

Known optical disc apparatus are incapable of recording additional data on an optical disc after an incomplete recording. Not only are such apparatus incapable of recording the data required to complete the incomplete recording, the apparatus is incapable of using the optical disc for any recording purpose. Also, the apparatus may encounter difficulty in reproducing the data recorded on the disc because the data structure of the recorded data differs from the data structure indicated by the track descriptor.

SUMMARY OF THE INVENTION

The invention provides a method for processing a previous recording of data on a write-once optical disc to enable the previous recording to be read when the previous recording is incomplete, and to enable additional data to be recorded on the write-once, optical disc following the previous recording when the previous recording is incomplete. The previous recording, when incomplete, lacks at least an end portion that would be included in the previous recording when complete. The method detects when the previous recording is incomplete. When the previous recording is detected as being incomplete, the position of the end of the previous recording is determined, a pseudo signal is generated for recording on the write-once optical disc, and the pseudo signal is written on the write-once optical disc, starting at the position of the end of the previous recording determined by the determining step. Writing the pseudo signal appends to the previous recording an additional recording including a replacement for the end portion lacking from the previous recording.

In the previous recording, the data are divided into tracks, and the data in each track has one of plural data structures. The data structures include a defined-length data structure that includes a defined-length element having a defined length between the head and the end of the element. The write-once optical disc includes attribute information indicating the data structure of the data in each track, and, if the track has a defined-length data structure, the length of the defined-length element. The previous recording includes a last track, which is the track in which the end of the previous recording is located. When the previous recording is incomplete, and the last track has the defined-length data structure, the previous recording lacks part of the defined-length element including the end portion. The method may additionally include steps in which the attribute information of the last track is read from the write-once optical disc, and it is determined from the attribute information whether the last track has the defined-length data structure. When the last track is determined to have the defined-length data structure and the recording is detected to be incomplete, the distance between the end of the previous recording and the end of the defined-length element is calculated using the position of the end of the previous recording, and the length of the defined-length element included in the attribute information read from the write-once optical disc. Finally, when the last track is determined to have the defined-length data structure, the pseudo signal is written to append to the previous recording an additional recording having a length equal to the distance calculated in the calculating step. The additional recording includes the replacement for the end portion lacking from the previous recording.

Alternatively, the last track of the previous recording may have a non-defined-length data structure, which lacks any defined-length element having a defined length between the head and the end of the element. When it is determined, from the attribute information read from the write-once optical disc, that the last track has the non-defined-length data structure, the pseudo signal is written to append to the previous recording the replacement for the end portion lacking from the previous recording, and no more.

A recording on the write-once optical disc, when complete, includes a normal end portion. The step of detecting when the previous recording is incomplete may include steps in which the end of the previous recording is detected, and the end portion of the recording is reproduced. The end portion is a part of the previous recording that ends with the end of the previous recording detected in the detecting step. The end portion of the previous recording reproduced in the reproducing step is compared with the normal end portion. Finally, when the comparing step determines that the end portion of the previous recording is different from the normal end portion, an indication that the previous recording is incomplete is provided.

The step of detecting when the previous recording is incomplete may additionally or alteratively include steps in which the attribute information is read from the write-once optical disc, from which it is determined whether the data in the last track has the defined-length data structure. When the data in the last track is determined to have the defined-length data structure, the end of the defined-length element is tested to determine whether it is recorded. If the end of the defined-length element is not recorded, an indication that the previous recording is incomplete is provided.

The step of determining the position of the end of the previous recording may include steps in which a search interval of a predetermined precision is defined. The search interval encompasses the end of the previous recording. The position on the write-once optical disc of the head of the search interval is determined. The previous recording is reproduced, starting from the position of the head of the search interval, to provide a reproduction signal. The reproduction signal is monitored, and a cessation of the reproduction signal indicates the position of the end of the recording.

The invention also provides an apparatus for processing a previous recording of data on a write-once optical disc to enable the previous recording to be read when the previous recording is incomplete, and to enable additional data to be recordable on the write-once optical disc following the previous recording when the previous recording is incomplete. The previous recording, when incomplete, lacks at least an end portion that would be included in the previous recording when complete. The apparatus comprises an incomplete recording detecting circuit that detects when the previous recording is incomplete, a recording end position determining circuit that determines the position of the end of the previous recording, a signal generating circuit that generates a pseudo signal for recording on the write-once optical disc, and a writing system that writes the pseudo signal generated by the signal generating circuit on the write-once optical disc. The writing system starts writing the pseudo signal at the position of the end of the previous recording determined by the recording end position determining circuit to append to the previous recording an additional recording including a replacement for the end portion lacking from the previous recording. The recording end determining circuit, the signal generating circuit, and the writing system operate when the incomplete recording detecting circuit detects that the previous recording is incomplete.

BRIEF DESCRIPTION OF THE DRAWINGS

FIGS. 10A and 10B are a flowchart showing the incomplete recording detection routine according to the invention.

FIG. 11 is a flowchart showing the subroutine for determining the position of the end of the recording according to the invention.

FIGS. 13A and 13B are a flowchart showing the completion operation according to the invention.

DETAILED DESCRIPTION OF THE INVENTION

The method by which an incomplete recording on a write-once optical disc is detected and completed according to the invention, and an apparatus for performing this method, will now be described with reference to the drawings.

Figure 3:
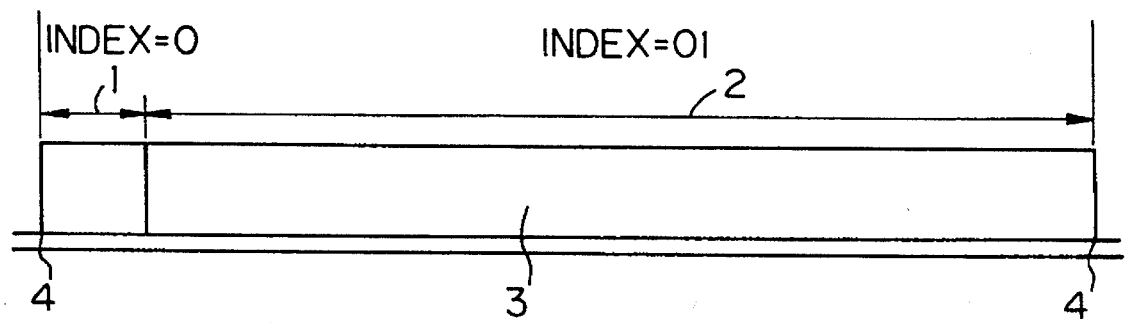
FIG. 3 is a schematic diagram showing an example of the data structure of a write-once optical disc track having a track-at-once data structure.
Figure 4:
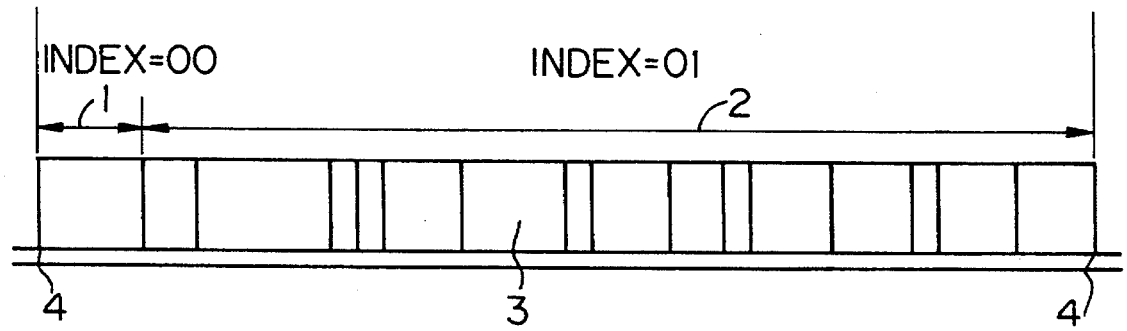
FIG. 4 is a schematic diagram showing an example of the data structure of a write-once optical disc track having a variable-length packet structure.
Figure 5:
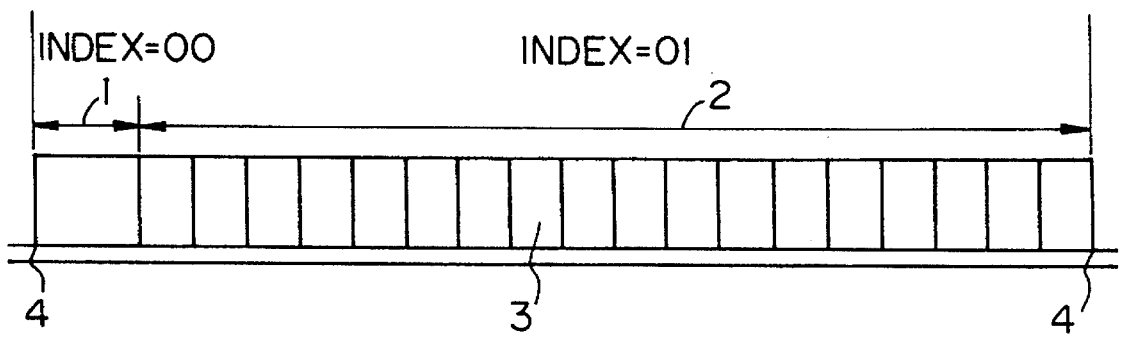
FIG. 5 is a schematic diagram showing an example of the data structure of a write-once optical disc track having a fixed-length packet structure.

FIGS. 3–5 show the data structure of a track which is divided into the region 1, having an index 00, which includes the track designator, and the region 2, having an index 01, in which the user data are written in one of three data structures. Data indicating the data structure of the user data are included in the track designator. Irrespective of the data structure, the track ends with the run-out region of the last packet of the track (i.e., of the only packet of the track if the track has a track-at-once data structure). The run-out region is two blocks long, and consists of a run-out region header code followed by a pseudo-signal which consists of, for example, a string of consecutive 0s). Such a runout region constitutes the "normal ending" of a complete recording.

FIG. 3 shows the data structure of a track having a track-at-once data structure. In a track having a track-at-once structure, the region 2 of the track, in which user data are recorded, consists of a single packet having a packet length equal to the track length. The length of the packet, and hence of the track length, is variable. The packet structure is similar to that shown in FIG. 2D, except that the number of blocks of user data in the packet is variable. As will be described below with reference to FIG. 6, the packet begins and ends with the link blocks 4, which consist of the link block region 5, the run-in region 6, and the run-out region 7.

FIG. 4 shows the data structure of a track having a variable-length packet structure. The user data are recorded in the region 2 of the track in a number of variable-length packets. Each packet consists an arbitrary number of blocks, greater than eight (a minimum-length packet consists of eight blocks: seven link blocks and one block of user data). The packet structure is similar to that shown in FIG. 2D, except that the number of blocks of user data in each packet is variable. As will be described below with reference to FIG. 6, each packet begins and ends with the link blocks 4, consisting of the link block region 5, the run-in region 6, and the run-out region 7.

Figure 1:
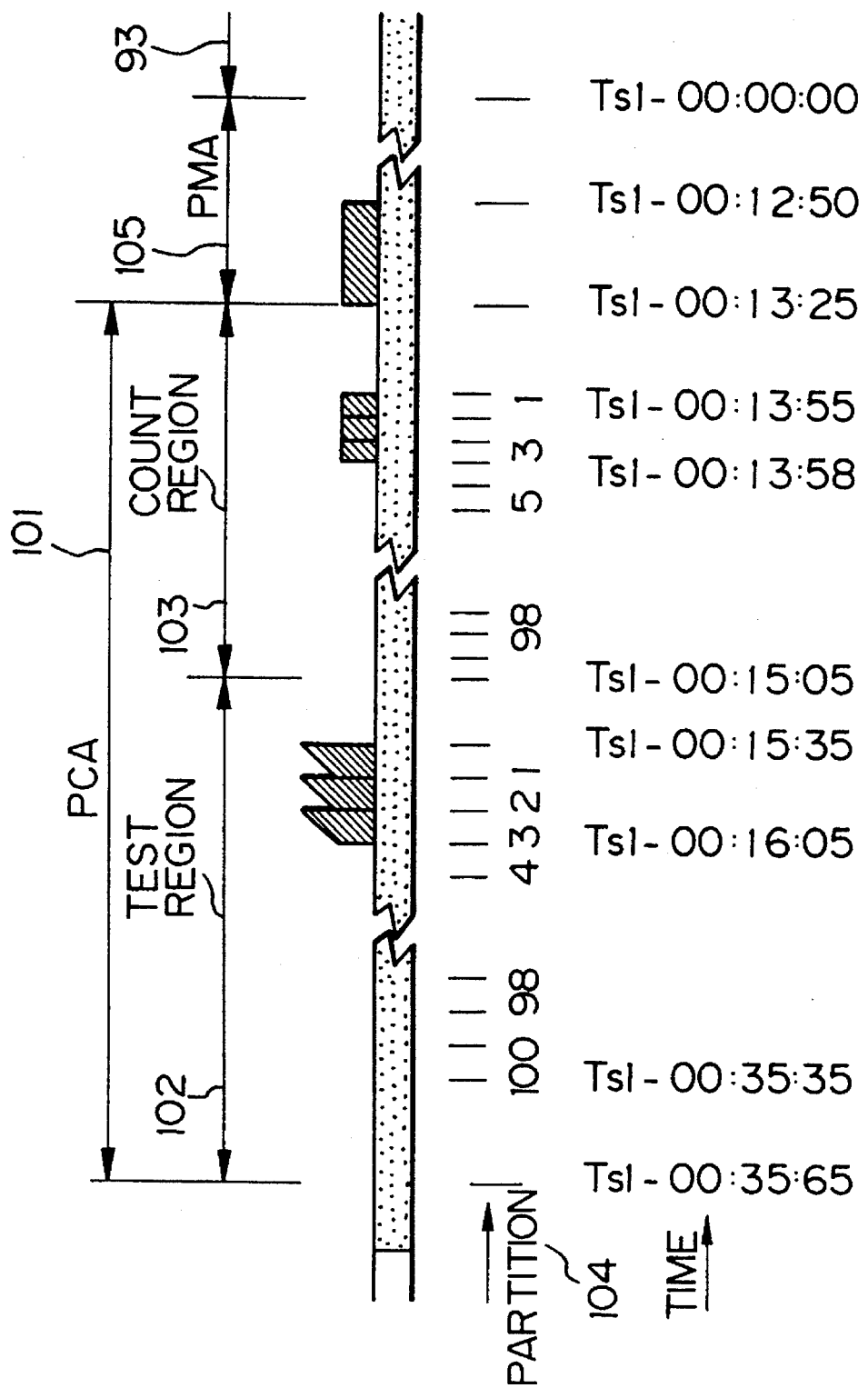
FIG. 1 is a schematic diagram showing an example of the data structure of the inner-rim portion of a conventional write-once, read many times, optical disc.
Figure 2A:
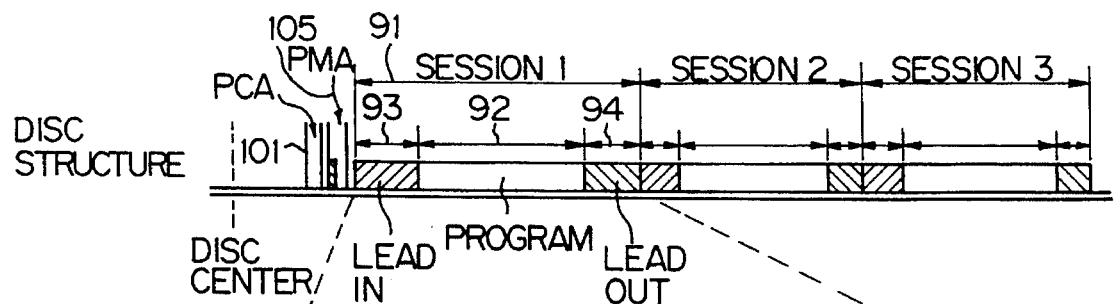
FIGS. 2A–2D show an example of the data structure of an optical disc to which the present invention is applied.
Figure 2B:
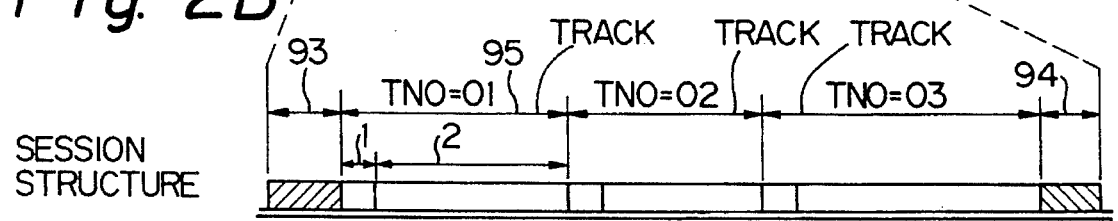
Figure 2C:
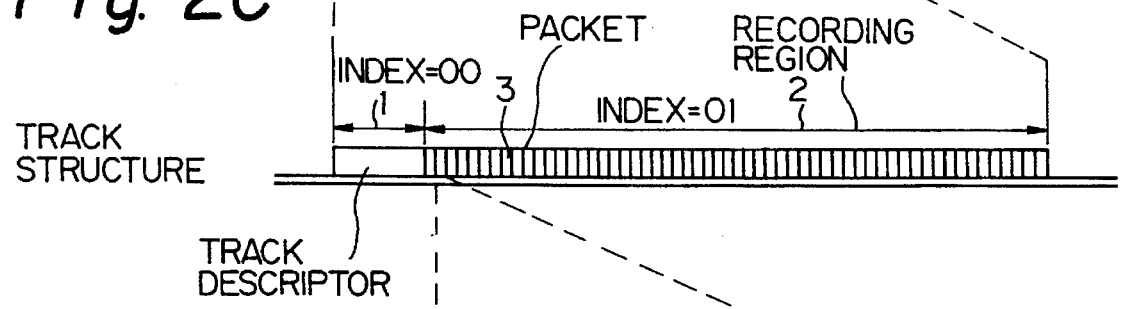
Figure 2D:
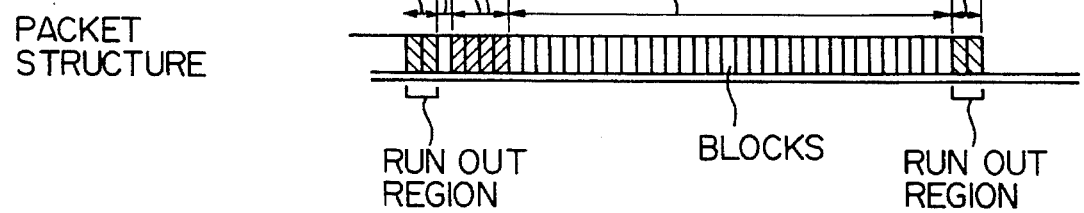

FIG. 5 shows the data structure of a track having a fixed-length packet structure. Information indicating that the track has a fixed-length structure, and the packet length expressed in terms of blocks, are recorded as part of the track descriptor in the region 1 of the track. The user data are recorded in the region 2 of the track in a number of fixed-length packets, all consisting of the same number of blocks. The structure of each packet is shown in FIG. 2D. As will be described below with reference to FIG. 6, each packet begins and ends with the link blocks 4, consisting of the link block region 5, the run-in region 6, and the run-out region 7.

Figure 6:
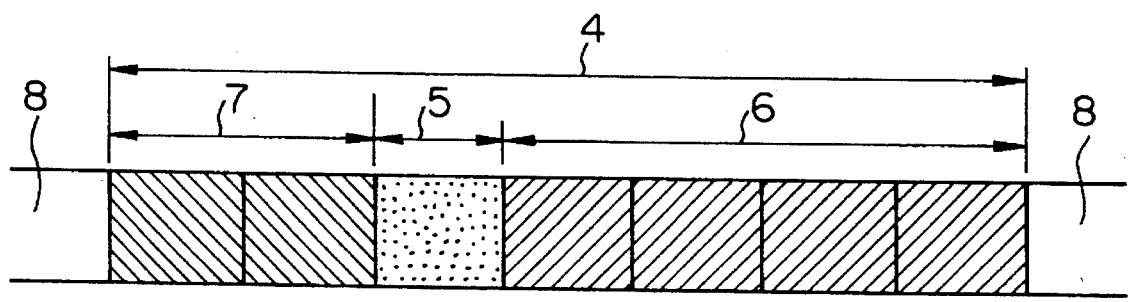
FIG. 6 is a schematic diagram showing an example of the packet connecting portion of a write-once optical disc.

FIG. 6 shows details of the data structure of the above-mentioned link blocks 4. The link blocks 4 of each packet consist of a total of seven blocks, namely, the link block region 5, which consists of one block, the run-in region 6, which consists of four blocks, and the run-out region 7, which consists of two blocks. FIG. 6 shows the link blocks 4 consisting of the link block region 5 and run-in region 6 of the present packet, and the run-out region 7 of the preceding packet.

Any one of the track-at-once (FIG. 3), the variable-length packet (FIG. 4), and the fixed-length packet (FIG. 5) data structures can be selected on a track-by-track basis as the data structure of the region 2 (FIG. 2C) of the track. The selected data structure of each track is indicated in the track descriptor recorded in part of the region 1 of the track. The lead-in region 93 and lead-out region 94 (FIG. 2A) of each session each consist of one track that may only have the track-at-once data structure shown in FIG. 3.

The minimum amount of data that may be recorded in the user area 2 of each track (FIG. 3) depends on the data structure of the track, which is indicated in the track descriptor recorded as part of the region 1 of the track. The minimum amount of user data that may be written in a track with the track-at-once data structure shown in FIG. 3 is one packet. The minimum amount of user data that may be written into a track with the variable-length packet structure shown in FIG. 4 is one packet consisting of one block. The minimum amount of user data that may be written into a track with the fixed-length packet structure shown in FIG. 5 is one packet of the predetermined packet length defined in the track descriptor recorded in the region 1 of the track.

A cross-interleaved Reed-Solomon code (CIRC) is applied to the data in each packet before it is recorded on the optical disc to provide error correction. The error correction code spreads the data in both the direction of motion of the wobble groove relative to the optical read/write head and in the direction opposite to the direction of motion. Consequently, when the recording is prematurely interrupted at a position other than at the end of a packet, part of the data is lost and the data in the packet cannot be reproduced. Therefore, to preserve the integrity the data recorded on the disc, the data in each packet must be recorded without interruption.

Figure 7:
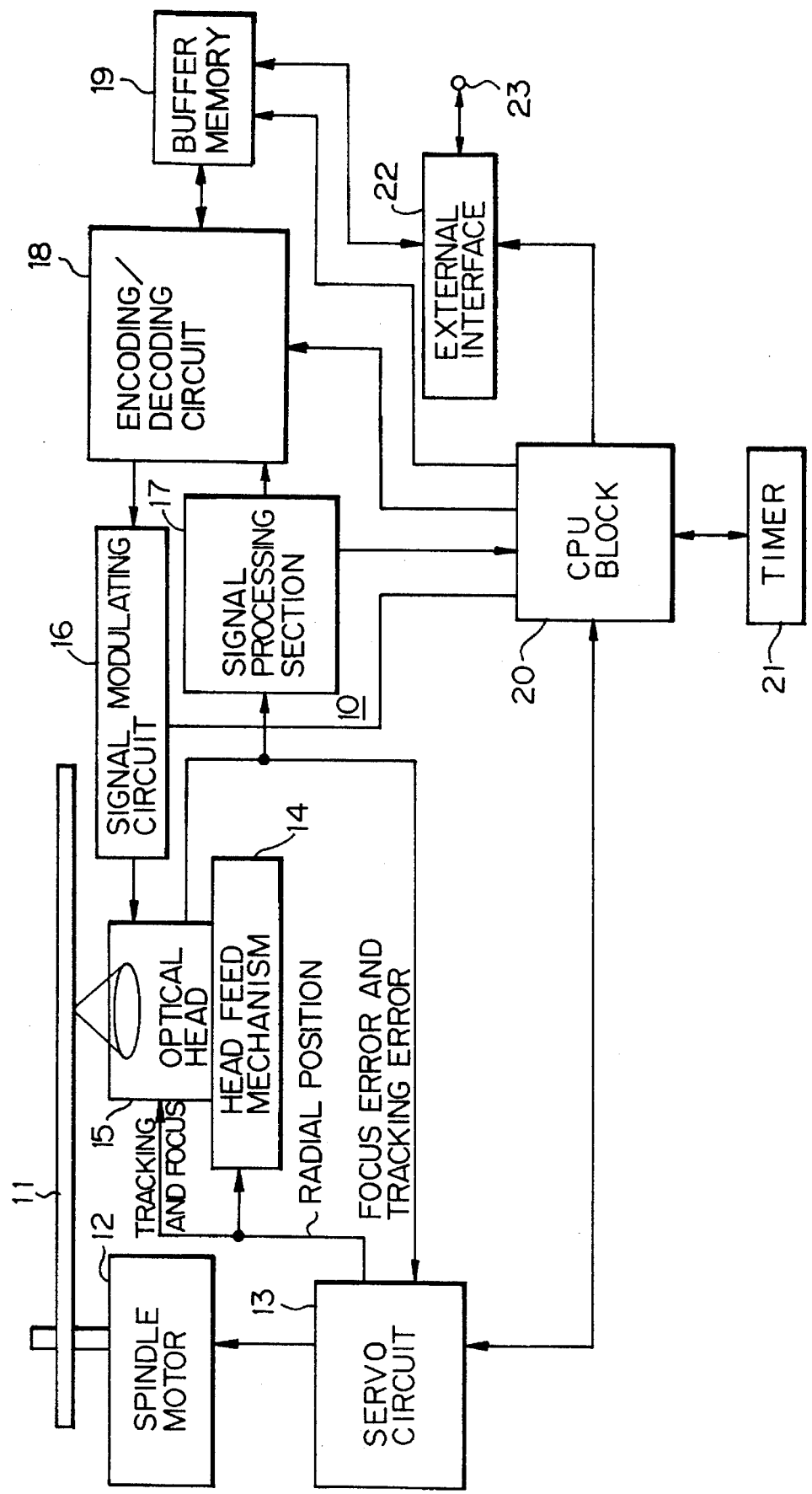
FIG. 7 is a block diagram showing an example an apparatus according to the invention for reading and writing a write-once optical disc.

An optical disc apparatus 10 embodying the invention and which may be used to practice the method according to the invention will now be described with reference to the drawings. FIG. 7 shows a block diagram of the optical disc apparatus. The optical disc 11 is a disc-shaped recording medium in which an organic pigment provides a recording surface. The spindle motor 12, operating under control of the servo circuit 13, rotates the optical disc 11 at a constant linear velocity (CLV) relative to the optical head 15. To record data on, and to reproduce data from, different parts of the optical disc 11, the optical head 15 is provided with the head feed mechanism 14 which, under control of the servo circuit 13, moves the optical head 15 radially relative to the disc.

The optical head 15 includes a light source (not shown), normally a laser, that illuminates the recording surface of the optical disc 11 and also includes a photosensitive device (not shown) that detects the light from the light source variable reflected by the recording surface according to the reflectivity of the recording surface. A four-spread detector, for example, may be used as the photosensitive detector. The RF output from the detector in the optical head 15 is fed to the signal processing section 17, which includes a preamplifier (not shown) that amplifies and performs addition and subtraction on the output signals generated by the detectors of the 4-spread detector. The signal processing section 17 derives the reproduced digital data from the RF output, and feeds the reproduced digital data to the encoding/decoding circuit 18.

The signal processing section 17 also derives a focusing error signal and a tracking error signal from the RF output of the optical head, and feeds these signals to the servo circuit 13. The servo circuit 13 uses the focusing error signal and tracking error signal to generate signals for controlling the head feed mechanism 14, which determines the radial position on the disc 11 at which data are recorded and reproduced, and for controlling the tracking and focusing of the optical head 15.

The control systems just described perform tracking control and focusing control of the optical head 15. These systems enable a signal representing a bit to be recorded at a predetermined location on the optical disc 11, and also enable data to be reproduced from a selected location on the disc. The data are recorded along a wobble groove preformed in the recording surface of the optical disc 11. The wobble groove enables the signal processing section 17 to derive the tracking error signal from the output of the 4-spread detector (not shown) in the optical head 15. Moreover, the wobble groove is frequency modulated with position information (ATIP). The absolute address of the current recording or reproduction location along the length of the wobble groove can be determined by reading and demodulating the position information.

The reproduced position information is supplied to the CPU 20. The CPU provides instructions to the servo circuit 13 to control access to locations on the optical disc 11 using the reproduced position information as a reference. In this way, the optical disc apparatus can sequentially record data in a predetermined region of the optical disc.

An example of the process used to search for the next recordable position after the previous recording will now be described. In the following description, references will be made to moving the optical head to the location of selected data on the disc, and recording data in a selected location on the disc. The optical head is only capable of moving radially relative to the disc. Accordingly, moving the optical head to the location of the selected data involves moving the optical head to the radial location of the data on the disc, and then waiting for the rotation of the disc to bring the selected data to a position where it can be read by the optical head. A similar 2-step process is involved in recording data in a selected location on the disc.

First, the CPU 20 searches the optical disc 11 to find an additionally-recordable region, i.e., a region in which the additional data can be recorded. Next, the CPU 20 sends instructions to the servo circuit 13, which causes the head feed mechanism 14 to move the optical head 15 to a location close to the head of the additionally-recordable region. In practice, for example, CPU causes the servo circuit 13 and the head feed mechanism 14 to move the optical head 15 to the head of the final packet of previous recording, and causes the optical head to begin reproducing the data in the final packet of the previous recording. Using the timer 21, the CPU 20 measures the output of the signal processing section 17 and monitors the reproduced data generated by the encoding/decoding circuit 18 in response to the final packet of the previous recording. When reproductiion of the previous recording ceases, the CPU 20 determines from the timing result generated by the timer 21, and from the reproduced data decoded by the encoding/decoding circuit 18, whether the previous recording is incomplete, i.e., whether the previous recording finished prematurely. The CPU 20 can alternatively make such a determination using only either the output of the signal processing section 17, or the reproduced data output generated by the encoding/decoding circuit 18.

If the CPU 20 determines that the previous recording is not incomplete, i.e., the previous recording is complete, it then proceeds with recording the additional data. If the CPU 20 determines that the previous recording is incomplete, i.e., that the previous recording finished prematurely, the optical disc apparatus completes the previous recording in response to a command received from an external apparatus via the terminal 23. In response to this command, the apparatus completes the incomplete previous recording on the optical disc 11 in a manner that provides the previous recording with a normal ending. Adding a normal ending to the previously incomplete recording enables the previous recording, although lacking pan of its data, to be reproduced normally, and allows additional data to be recorded following the completed previous recording. To complete the incomplete previous recording, the CPU 20 first reads the track descriptor in the region 1 of the final track of the incomplete recording to determine the data structure of the incomplete final track of the previous recording. From this, the CPU 20 determines the size of the minimum-length packet of the data structure of the incomplete final track. The CPU 20 then instructs the servo circuit 13 to cause the head feed mechanism 14 to move the optical head 15 to a position just before the end of the incomplete recording, and instructs the optical head to start reproducing the incomplete recording from this position.

In preparation for adding a normal ending to the incomplete recording, the CPU 20 causes the encoding/decoding circuit 18 to generate a pseudo signal (for example, a string of 0s), that will be used to append a normal ending to the incomplete previous recording. The CPU 20 determines the position of the end of the incomplete recording using the information previously determined by reproducing the incomplete recording. When the end of the incomplete recording is reached, the CPU 20 instructs the signal modulating circuit 16 to cause the optical head 15 to start recording the pseudo signal generated by the encoding/decoding circuit 18. The optical head 15 then records the pseudo-signal on the optical disc 11 following the end of the incomplete recording, and records a sufficient amount of the pseudo signal to provide the incomplete recording with a normal ending. After it has finished recording the required amount of the pseudo signal, for example, an amount equivalent to the minimum-length packet, the CPU 20 instructs the signal modulating circuit 16 to stop generating the pseudo signal, and causes the optical head 15 to stop recording.

Figure 8:
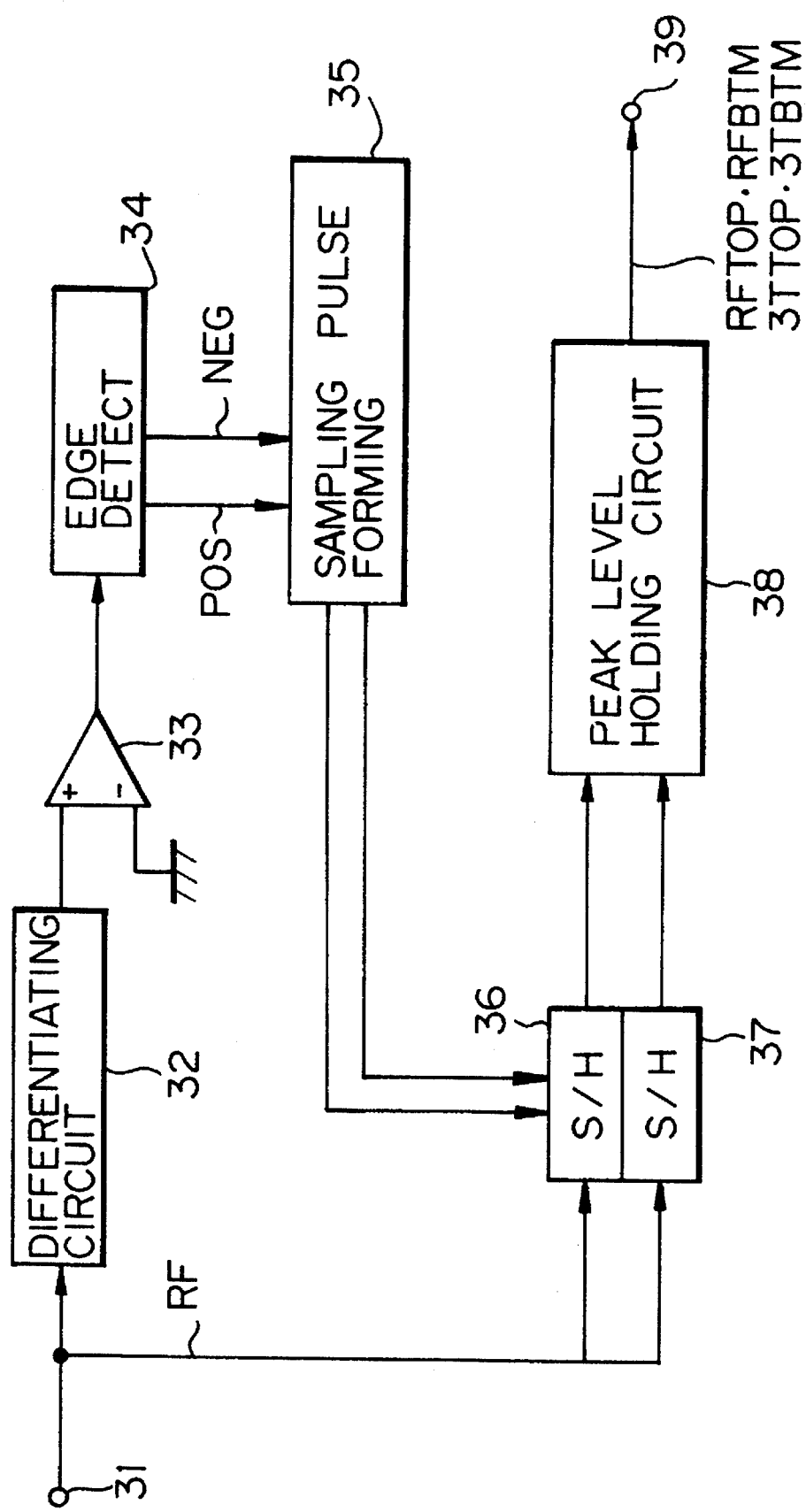
FIG. 8 is a block diagram showing an example of an asymmetry detecting circuit.

Additional details of the optical disc apparatus 10 according to the invention will now be given with reference once again to FIG. 7. The reproduced RF signal from the optical head 15 is fed to the signal processing section 17. As will be described further below with reference to FIGS. 8 and 9, the signal processing section derives the reproduced digital signal level from the signal level of the reproduced RF signal, and feeds the reproduced digital signal to the CPU 20.

The external interface circuit 22 supplies data reproduced from the optical disc 11 to, and receives data for recording on the optical disc from, the host computer or other apparatus (not shown) via the terminal 23 under the control of the CPU 20.

The data reproduced from the optical disc 11 are temporarily stored in the buffer memory 19 and are transferred to the host computer via the external interface circuit 22 and the terminal 23 at a predetermined timing. The data for recording on the optical disc 11 received from the host computer via the external interface circuit 22 and the terminal 23 are temporarily stored in the buffer memory 19 and are recorded on the optical disc 11 at a predetermined timing. The buffer memory 19 is provided to absorb differences between the data rate of the optical disc apparatus 10 and the data rate at which the data are transferred between the optical disc apparatus and the host computer.

Data for recording on the optical disc 11 are transferred from the buffer memory 19 to the encoding/decoding circuit 18, where they are subject to such processes as eight-to-fourteen modulation (EFM), error correction coding, and the like, and the resulting coded data are supplied to the signal modulating circuit 16. The signal modulating circuit 16 is controlled by the CPU 20. The signal modulating circuit supplies an on/off control signal to the light beam for recording generated by the laser (not shown) in the optical head 15. The light beam for recording causes non-reflective areas to be formed in the recording layer of the optical disc 11 in accordance with the state of the bits of the coded data supplied to the signal modulating circuit 16 by the encoding/decoding circuit 18.

The data reproduced from the optical disc 11 are stored in the buffer memory 19 after the RF signal from the optical head 15 has been processed by the signal processing section 17 and encoding/decoding circuit 18. The data stored in the buffer memory 19 are transferred to the host computer via the external interface circuit 22 and terminal 23 at a predetermined timing.

By controlling the servo circuit 13 before start of the recording, the intensity of the light beam used for recording is adjusted using a predetermined test pattern. An example of the asymmetry detecting circuit forming part of the signal processing section 17 of the optical disc apparatus 10 according to the invention signal will now be described with reference to FIGS. 8 and 9. The asymmetry detecting circuit receives the reproduced RF signal from the preamplifier (not shown) in the optical head 15 via the input terminal 31, whence the reproduced RF signal passes to the differentiating circuit 32. The differentiating circuit differentiates the reproduced RF signal, which has a sinusoidal waveform, to provide a differentiated signal. The signal level of the differentiated signal has zero crossings synchronous with the positive and negative peaks of the reproduced RF signal. The comparator 33 compares the signal level of the differentiated signal with a zero-level reference. As a result, the output signal of the comparator changes state synchronously with the zero crossings of the differentiated signal. The edge-detecting circuit 34 generates edge-detection signals POS and NEG. The edge-detection signals both consist of a fixed-width positive-going pulse generated synchronously with each positive-going edge and each negative-going edge, respectively, of the output signal from the comparator 34.

The sampling pulse forming circuit 35 produces first and second sampling pulses whose signal levels rise synchronously with the rising edges of the edge detection signals POS and NEG, respectively. The sampling pulses are supplied to the sample-and-hold (S/H) circuits 36 and 37. The S/H circuits 36 and 37 sample and hold the peak positive amplitude and the peak negative amplitude of the reproduced RF signal in response to the first and second sampling pulses, respectively.

Figure 9:
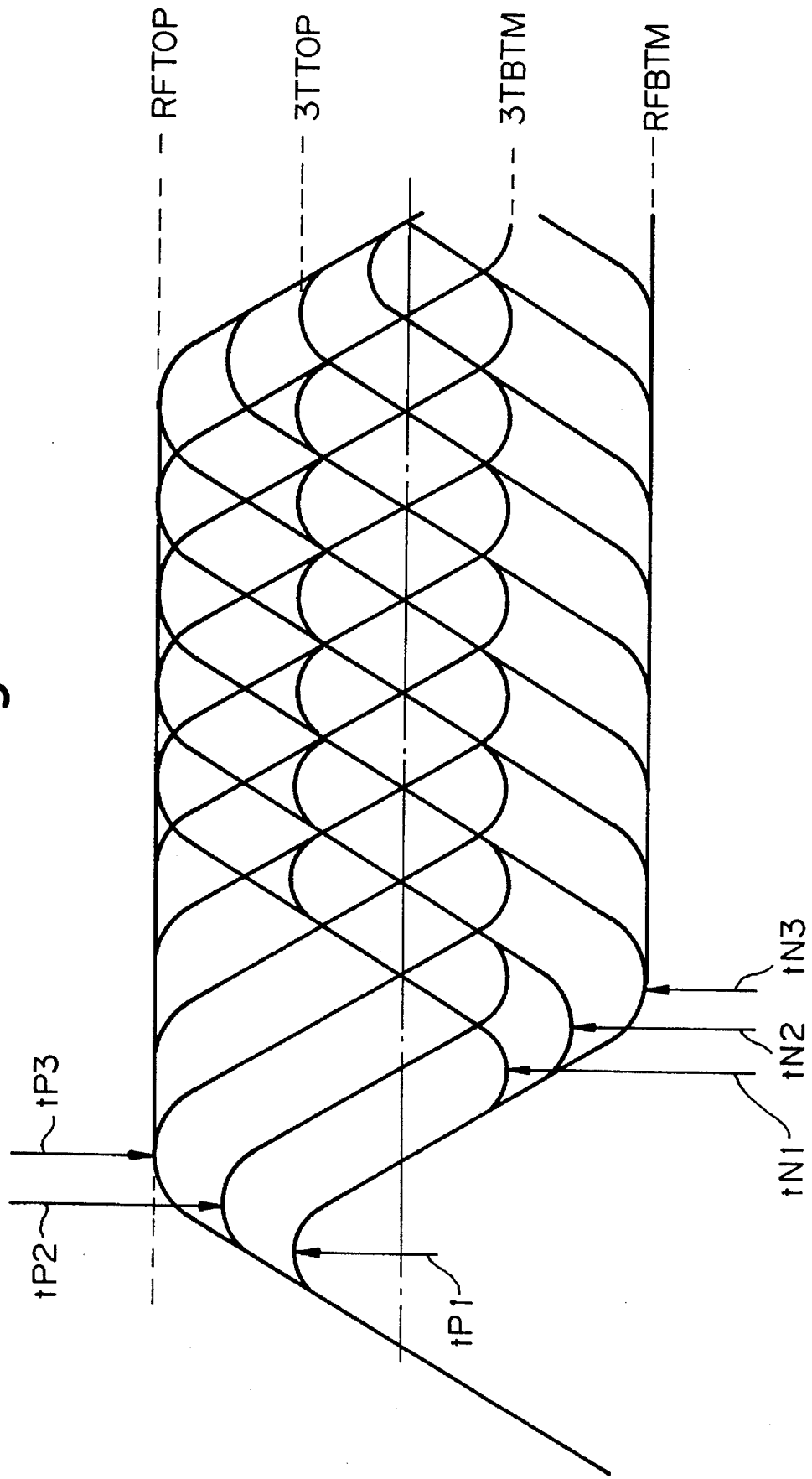
FIG. 9 is a signal waveform diagram for explaining the operation of the asymmetry detecting circuit.

FIG. 9 shows how the sample-and-hold circuits 36 and 37 in the asymmetry detecting circuit sample the signal level of the reproduced RF signal from the optical head 15. In the sample-and-hold circuit 36, the signal level of the reproduced RF signal is sequentially sampled at the timings tP1, tP2, tP3, . . . , i.e., at the peak positive levels of the reproduced RF signal. In the sample-and-hold circuit 37, the signal level of the reproduced RF signal is sequentially f the reproduced RF signal.

The peak level holding circuit 38 holds the peak positive value and the peak negative value respectively generated by the sample-and-hold circuits 36 and 37 to determine the following levels of the reproduced RF signal:

(a) the peak positive level RFTOP resulting from reproducing a land (i.e., a reflective portion of the recording surface of the disc) having a pulse width of 11 T, (b) the peak negative level RFBTM resulting from reproducing a pit (i.e., a non-reflective portion of the recording surface of the disc) having a pulse width of 11 T, (c) the peak positive level 3TTOP resulting from reproducing a land having a pulse width of 3 T, and (d) the peak negative level 3TBTM resulting from reproducing a pit having a pulse width of 3 T.

The peak level holding circuit 38 supplies the above results to the CPU 20 via the output terminal 39.

After receiving the results from the asymmetry detection circuit, the CPU 20 processes the results by executing an arithmetic operation according to the following equation (1) to determine the asymmetry Asy:

$$Asy = \frac{3TTOP + 3TBTM - (RFTOP + RFBTM)}{2(RFTOP - RFBTM)} \quad (1)$$

In the signal reproduced from the optical disc 11, the probability of occurrence of a pit and a land having a pulse width of 3 T is ⅓. Therefore, adding the peak positive level 3TTOP and the peak negative level 3TBTM obtained by reproducing a reflectance feature (i.e., a pit or a land) with a pulse width of 3 T, generates a level that is twice as high as the slice level SL in which the probabilities of logical 0s and logical 1s occurring are equal.

Therefore, the asymmetry Asy can be easily detected by executing the arithmetic operation set forth in equation (1). In this instance, in the asymmetry detection, after the peak positive level and the peak negative level are sequentially sampled, the minimum value and maximum value of each sampling result are detected., and the peak positive level 3TTOP and the peak negative level 3TBTM resulting from reproducing a reflectance feature having a pulse width of 3 T, and the peak positive level RFTOP and the peak negative level RFBTM resulting from reproducing a reflectance feature having a pulse width of 11 T are detected, so that the asymmetry Asy can be detected in considerably less time than conventionally. Using this technique, the intensity of the light beam used for recording can be adjusted rapidly using a short light intensity adjusting region.

Using the above-described asymmetry detection method, after the peak positive level and the peak negative level have been sequentially sampled, the minimum and maximum values of each sampling result are detected, the peak positive level 3TTOP and peak negative level 3TBTM resulting from reproducing a reflectance feature having a pulse width of 3 T, and the peak positive level RFTOP and peak negative level RFBTM resulting from reproducing a reflectance feature having a pulse width of 11 T are detected, and the asymmetry is calculated from these results, so that the asymmetry can be easily and rapidly determined.

Figure 10B:
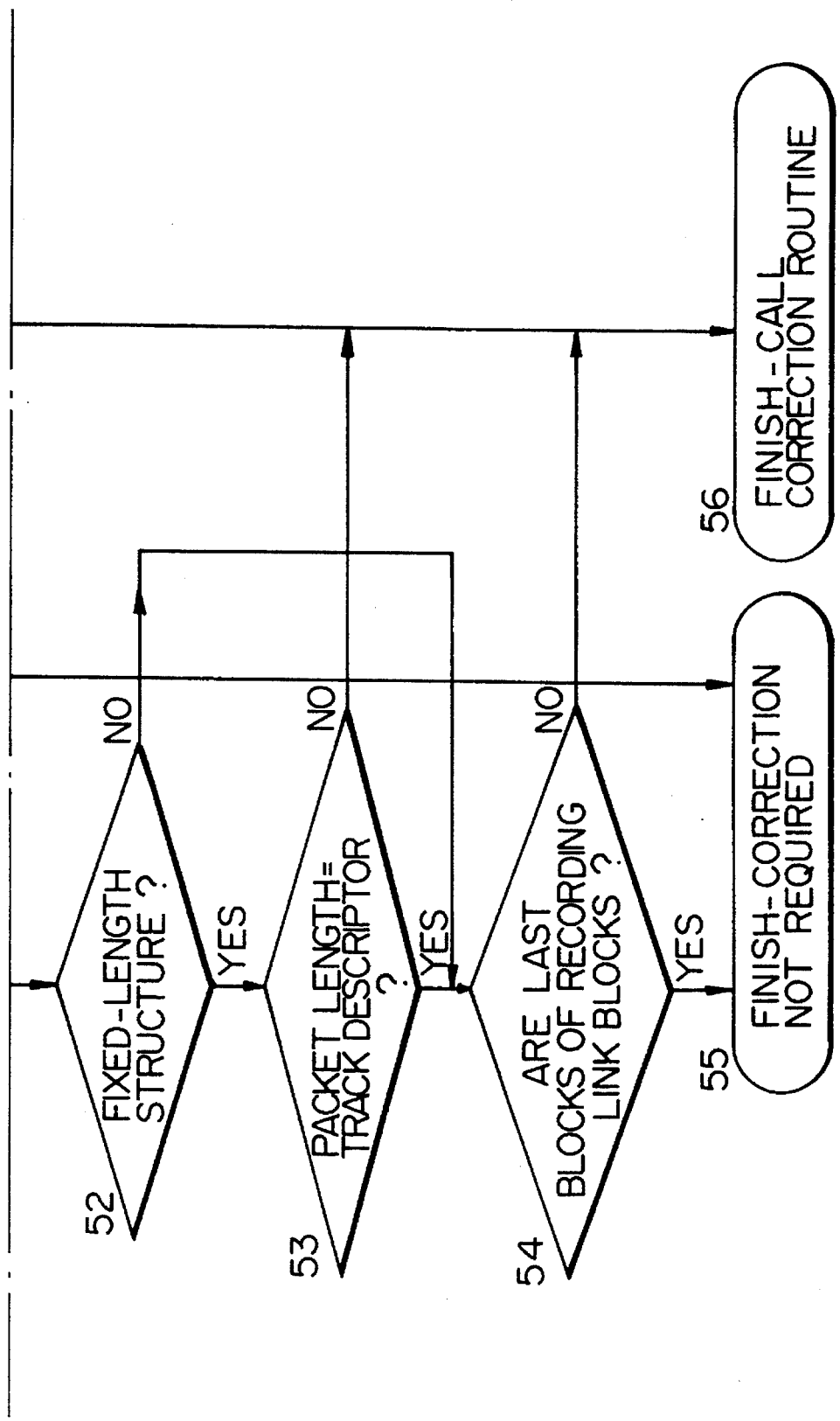

The processes by which the CPU 20 controls the optical disc apparatus 10 to detect an incomplete recording and to append a normal ending to the incomplete recording to enable the incomplete recording to be read, and to enable additional data to be recorded following the incomplete recording, will now be described with reference to the flow charts shown in FIGS. 10–13. FIG. 10 illustrates the incomplete recording detection routine that examines the previous recording to determine whether the previous recording is incomplete, and therefore requires completion. The incomplete recording detection routine illustrated in FIG. 10 begins at step 41.

At step 42, the routine determines whether the position of the end of the last track of the previous recording has been defined. This position is defined if the address of the head of the last track of the previous recording and the length of the last track are written in the directory of the disc, for example. When the position of the end of the last track of the previous recording is not defined, the routine jumps to step 45. When the position of the end of the last track of the previous recording is defined, the routine advances to step 43.

At step 43, the optical head 15 is moved to the defined position of the end of the last track of the previous recording, and the routine advances to step 44.

At step 44, a test is performed to determine whether the end of the last track of the previous recording is recorded. If the end of the track is not recorded, the routine advances to step 45. If the end of the track is recorded, indicating that the recording has a normal ending, the routine jumps to step 55. Step 55 is last step of the incomplete recording detection routine to which the routine jumps when it determines that the previous recording is complete, and that there is no need to complete the recording. The incomplete recording detection routine finishes at step 55 without calling the completion routine that will be described below with reference to FIG. 13.

The incomplete recording detection routine advances from step 42 or from step 44 to step 45. In other words, step 45 is executed if it is determined at step 42 that the position of the end of the last track of the recording is not defined, or if it is determined at step 44 that the defined end of the last track is not recorded. At step 45, the optical head 15 is moved to the head of the last track of the recording, and execution advances to step 46.

At step 46, a test is performed to determine whether the head of the last track of the recording is recorded. When the head of the last track is unrecorded, the incomplete recording detection routine jumps to step 55, where it finishes without calling the completion routine. When the head of the last track is recorded, the routine advances to step 47.

At step 47, a test is performed to determine whether the track descriptor of the last track of the previous recording has been recorded. When the track descriptor has not been recorded, completion of the recording is necessary, and the routine jumps to step 56, where the routine finishes indicating that completion is necessary. This calls the completion routine, which will be described below with reference to FIGS. 11–13. When the track descriptor of the last track has been recorded, the routine advances to step 48.

At step 48, the data structure identifier is extracted from the track descriptor of the last track of the previous recording and is examined to determine whether the last track has a track-at-once data structure. When the last track has a track-at-once structure, the routine advances to step 49.

At step 49, the subroutine, which will be described below with reference to FIGS. 11 and 12, for determining the position of the end of the recording is performed. The incomplete recording detection routine then jumps to step 56, where it finishes and calls rite completion routine, which will be described below with reference to FIG. 13.

When the routine determines at step 48 that the last track of the previous recording does not have a track-at-once structure, i.e., when the last track has either a fixed-length packet structure or a variable-length packet structure, the routine advances to step 50.

At step 50, the packets of the last track of the previous recording are sequentially searched, starting at the head packet of the track, to locate the final packet of the track, and the optical head 15 is moved to the head of the final packet.

At step 51, the subroutine, which will be described below with reference to FIGS. 11 and 12, for determining the position of the end of the recording is performed. The routine then advances to step 52.

At step 52, the data structure information extracted from the track designator of the last track of the recording is examined to determine whether the last track has a fixed-length packet data structure. When the last track has a fixed-length packet structure, execution passes to step 53.

At step 53, the number of blocks between the head and the end of the final packet is counted and the count is compared with the packet length expressed in blocks, e.g., 32 blocks, extracted from the track descriptor. When the number of blocks counted coincides with the packet length extracted from the track descriptor, the routine jumps to step 54. When the number of blocks counted is different from the packet length extracted in the track descriptor, the incomplete recording detection routine advances to step 56, where it finishes and calls the completion routine, which will be described below with reference to FIG. 13.

At step 54, a test is applied to a last track that was either (a) determined at step 52 to have a variable-length packet data structure, or (b) determined at step 52 to have a fixed-length packet structure, and was determined at step 53 to contain the same number of blocks as the number of blocks indicated by the track descriptor. The test determines whether the last two blocks of the last track of the previous recording are the same as the link blocks constituting the normal ending of the last track of a complete recording. If the last two blocks are different from the link blocks that constitute the normal ending of the last track of a complete recording, the incomplete recording detection routine advances to step 56 where it finishes and calls the completion routine, which will be described below with reference to FIG. 13. On the other hand, if the last two block of the last track are the same as the link blocks that constitute the normal ending of the last track of a complete recording, the incomplete recording detection routine advances to step 55, where it finishes without calling the completion routine.

The above-mentioned steps 49 and 51, in which a subroutine is performed for determining the position of the end of the recording, will now be described in detail with reference to the flow charts shown in FIGS. 11 and 12. The subroutine for determining the position of the end of the recording detects the end of the recording and starts at step 61.

At step 62, the subroutine calls a second subroutine, which will be described below with reference to FIG. 12, to determine the position X of the head of a search interval that has a precision of $\delta$, and which includes the end of the recording at a position X+$\gamma$. In this embodiment, the second subroutine called at step 62 determines the position X using the middle-point search method, which will be described in detail below with reference to FIG. 12. When the second subroutine finishes, it returns the value of X, and the subroutine advances to step 63.

At step 63, the optical head is positioned at the position X of head of the search interval determined in step 62, and begins reproducing the recording from that position. When the end of the recording is detected, the position (X+$\gamma$) of the end of the recording is determined. The subroutine finishes in step 64, and returns the position X of the head of the search interval, and the position (X+$\gamma$) of the end of the recording. These values are later used by the incomplete recording detection routine and by the completion routine.

Figure 12:
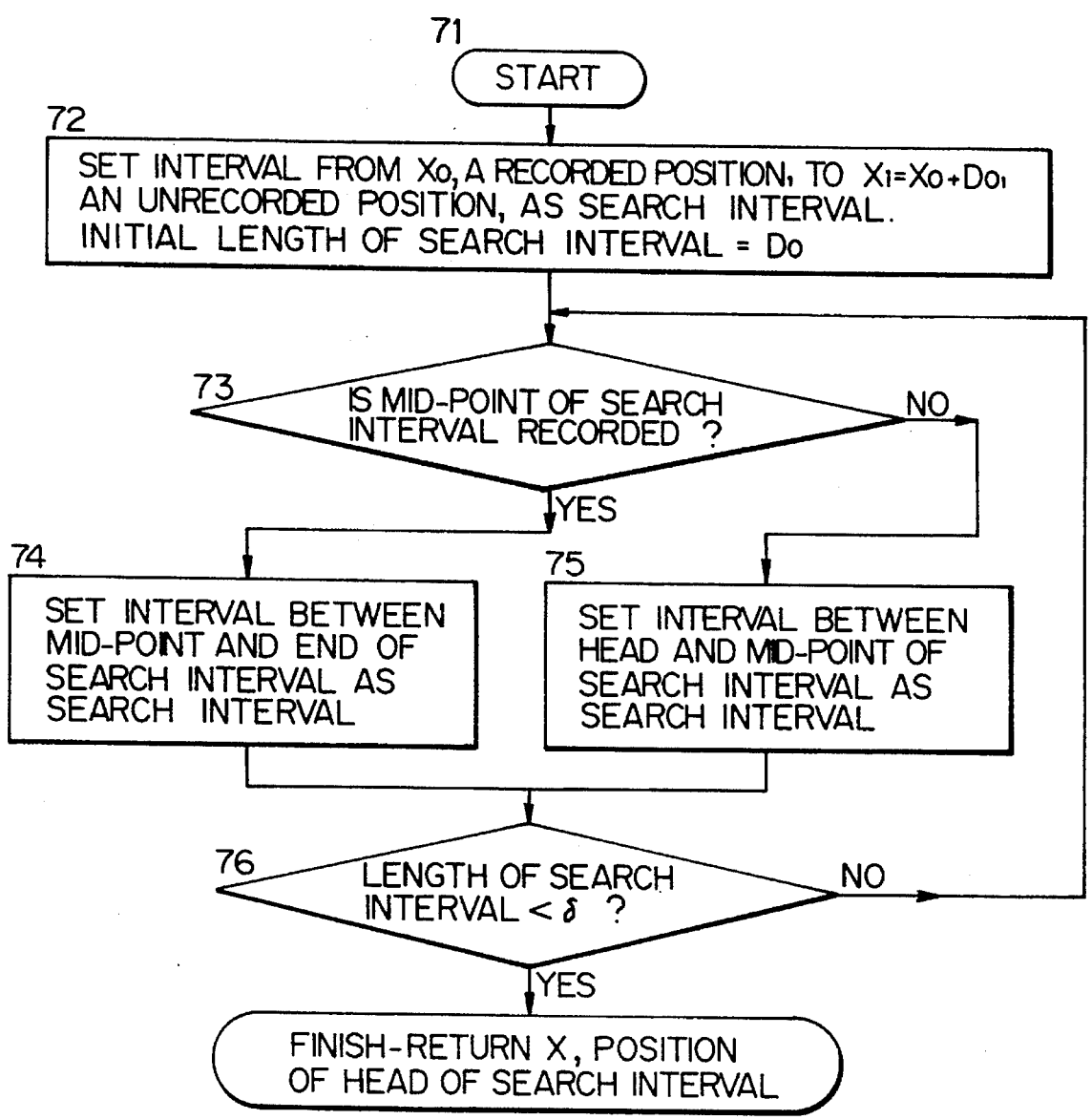
FIG. 12 is a flowchart showing the second subroutine according to the invention for performing a middle point search to determine the position of the start of the search interval with precision δ in which the end of the recording is located.

FIG. 12 is a flowchart of the second subroutine called at step 62 of the subroutine to determine the position of the end of the recording. The second subroutine determines the position X of the head of the search interval that has a precision of $\delta$, and which includes the end of the recording at (X+$\gamma$). In this embodiment, the middle-point search method is used to determine the position X of the head of a search interval that has a precision of $\delta$. The second subroutine begins at step 71.

At step 72, the search interval that is used to determine the position of the end of the recording is set to an initial value that encompasses a recorded position X0 on the last track of the recording and an unrecorded position X1. The initial value of the search interval from the recorded position X0 to the unrecorded position X1 has a length of D0. Execution then passes to the loop consisting of steps 73, 74 or 75, and 76 which is executed a number of times, including a time n, until the test performed at step 76 generates a YES result. The loop is executed using the length Dn of the search interval as variable. In the first iteration of the loop, the search interval is the initial search interval set in step 72. In all subsequent iterations, the search interval is the search interval set in step 74 or in step 75 of the previous iteration.

At step 73, the optical head is moved to the position of the mid-point of the search interval, the track is reproduced at the mid-point of the search interval, and a test is performed to determine whether the mid-point X½n of the search interval is recorded. When the mid-point of the search interval is recorded, the second subroutine advances to step 74. When the mid-point of the search interval is not recorded, the second subroutine advances to step 75. For example, in the first iteration of the loop, the test determines whether the mid-point between the start point X0 and the end point X1 of the search interval which was initially set in step 72 is recorded.

At step 74, the interval between the mid-point X½n of the search interval and the end of the search interval is set as a new search interval, and the distance between the mid-point of the search interval and the end of the search interval is set as the length Dn+1 of the new search interval. For example, in the first iteration of the loop, the interval between the mid-point X½ and the end X1 of the search interval between X0 and X1 set in step 72 is set as the new search interval, and the distance between the mid-point and the end of the search interval set in step 72 is set as the length D1 of the new search interval. The second subroutine then advances to step 76.

Alternatively, at step 75, the interval between the start of the search interval and the mid-point X½n of the search interval is set as the new search interval, and the distance between the start and the mid-point of the search interval is set as the length Dn+1 of the new search interval. For example, in the first iteration of the loop, the interval between the start X0 and the mid-point X½ of the search interval between X0 and X1 set in step 72 is set as the new search interval, and the distance between the start and the mid-point of the search interval set in step 72 is set as the length D1 of the new search interval. The second subroutine then advances to step 76.

At step 76, a test is performed to determine whether the length Dn+1 of the search interval set in step 74 or in step 75 is less than the precision $\delta$. When the length of the new search interval is less than the precision $\delta$, the second subroutine advances to step 77, where the second subroutine finishes by returning the value of X, the position of the head of the search interval that has a precision of $\delta$ and that includes the end of the recording. When the length of the new search interval is equal to or greater than the precision $\delta$, the second subroutine returns to step 73, and the loop consisting of steps 73, 74 or 75, and 76 is executed once more using the shorter search interval determined in step 74 or step 75 of the previous iteration as the search interval. The loop continues to execute until it is determined in step 76 that the length Dn+1 of the new search interval is less than the precision δ, i.e., that the position of the end of the recording has been determined using the middle point search method with a precision of δ.

Figure 13B:
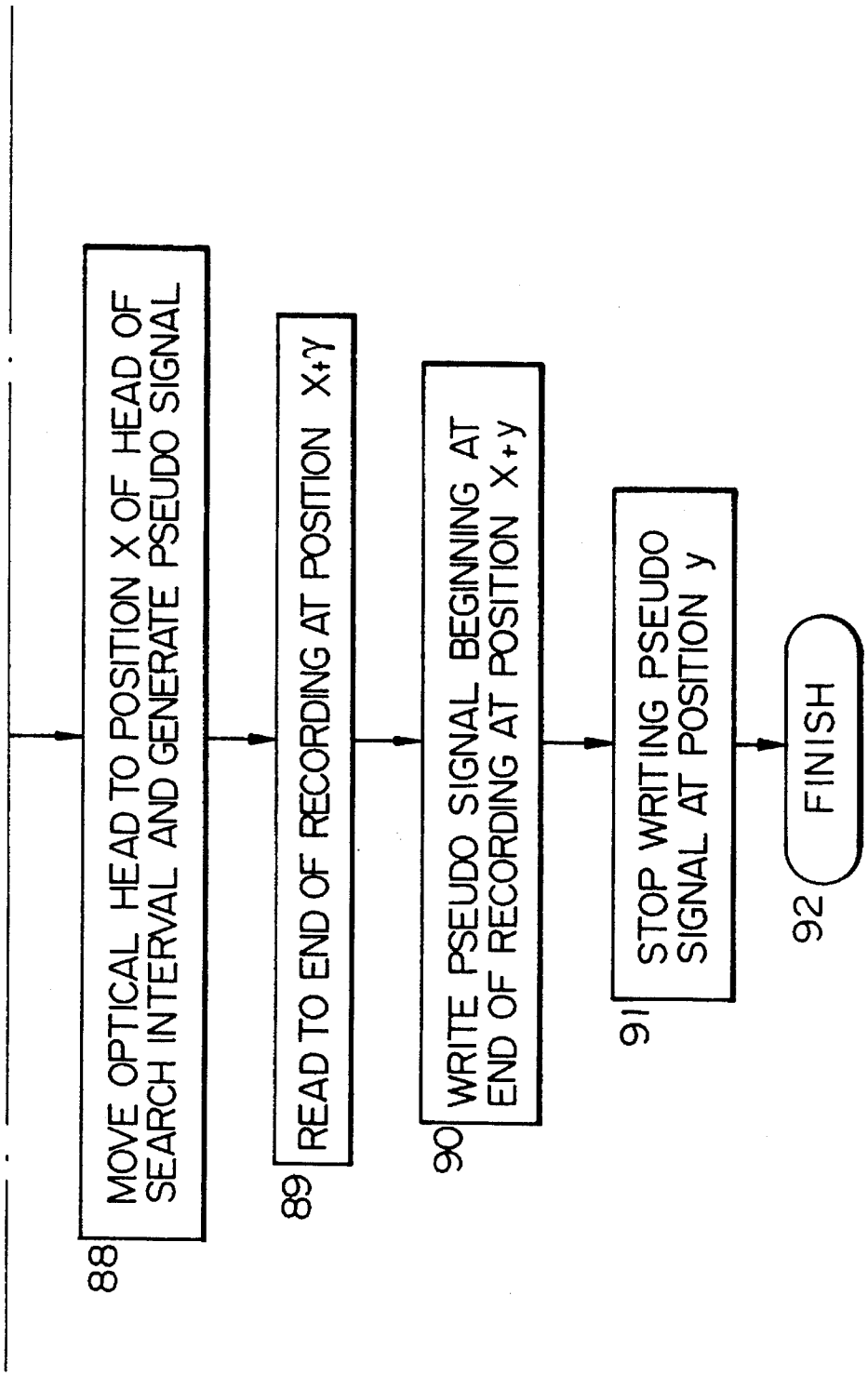

The completion routine executed by the CPU 20 to complete a previous recording determined to be incomplete by the incomplete recording detection routine described above with reference to FIG. 10 will now be described with reference to the flowchart shown in FIG. 13. The completion routine is called by execution of step 56 of the incomplete recording detection routine. The completion routine starts at step 81.

At step 82, the track descriptor of the last track of the previous recording is read, and the data structure information therein is examined to determine whether the last track has a track-at-once data structure. When the last track does not have a track-at-once structure, i.e., the last track has a variable-length packet structure or a fixed-length packet structure, the routine advances to step 83, which will be described below. When the last track has a track-at-once structure, the routine advances to step 84.

At step 84, the routine determines whether the last track of the recording, determined at step 82 to have a track-at-once data structure, has a defined track length. The track length of the track may be defined in the directory of the disc, for example. When the track does not have a defined track length, the routine advances to step 87, which will be described below. When the track does have a defined track length, the routine advances to step 85.

When the last track of the recording is determined at step 84 to have a defined track length, the last track, when completed by the completion routine, must have a length equal to the defined track length. Accordingly, at step 85, the routine sets the variable y, which denotes the position of the end of the recording after completion, to a value corresponding to the defined track length of the last track. The routine then jumps to step 88, which will be described below.

When it is determined at step 82 that the last track of the previous recording does not have a track-at-once data structure, i.e., when the track has a fixed-length packet structure or a variable-length packet structure, the routine advances to step 83. At step 83, the data structure information included in the track descriptor of the last track of the previous recording is examined once more to determine whether the last track has a fixed-length packet data structure. When the last track does not have a fixed-length packet structure, i.e., when the track has a variable-length packet structure, the routine advances to step 87, which will be described in detail below. When the last track has a fixed-length packet structure, the routine advances to step 86.

When the last track of the previous recording has a fixed-length packet structure, the final packet of the last track, when completed, must contain the number of blocks indicated by the packet-length information included in the track descriptor of the final track. Accordingly, at step 86, the routine extracts the packet-length information from the track descriptor of the final track, and sets the variable y, which denotes the location of the end of the recording after completion, to a value corresponding to the end of a packet consisting of the number of blocks indicated by the packet-length information extracted from the track descriptor. The routine then advances to step 88, which will be described below.

When it is determined at step 84 that the last track has a track-at-once data structure, but the track does not have a defined track length, or when it is determined at step 83 that the last track has a variable-length packet data structure, execution passes to step 87. When a track has a track-at-once data structure, but does not have a defined track length, or a track has a variable-length packet data structure, the track can have any length, and the recording can be completed simply by completing the block in which the end of the recording is located (if this block is incomplete), and by appending the two linking blocks that constitute, the normal ending of a complete recording. Accordingly, at step 87, a track that has a track-at-once structure or a variable-length packet structure is processed by setting the variable y, which denotes the position of the end of the recording after completion, to a value corresponding to two blocks beyond the end of the block containing the end of the recording. The routine then advances to step 88.

At step 88, the optical head 15 is moved to the position X on the last track, which is the head of the search interval (X, X+δ) determined in the second subroutine shown in FIG. 12. At the same time, the routine causes the signal modulating circuit 16 to begin generating the pseudo signal that will later be recorded to complete the recording. The routine then advances to step 89.

At step 89, the recorded part of the last track is reproduced from the head of the search interval to the end of the recording at the position (X+γ). The position of the end of the recording was determined at step 63 of the subroutine for determining the position of the end of the recording called by the incomplete recording detection routine described above with reference to FIG. 10. When the end of the recording has been reproduced, the routine advances to step 90.

At step 90, the routine causes the optical head 15 to begin recording the pseudo signal on the optical disc, starting from the position of the end of the recording at (X+γ).

At step 91, the routine causes the optical head 15 to stop recording the pseudo-signal when the recording position reaches the position y of the end of recording after completion. The value of y was set in step 85, step 86 or step 88. The routine then advances to step 92.

At step 92, the completion routine finishes.

The formerly incomplete recording, when completed by the completion routine just described, can be read without difficulty using any optical disc apparatus capable of reproducing CD-R optical discs. Moreover, additional data can be recorded on the optical disc following the completed incomplete recording by the optical disc apparatus according to the invention, or by other optical disc apparatus capable of recording CD-R optical discs.

The invention enables an optical disc apparatus to record additional data, even when the previous recording operation has been prematurely interrupted. The premature interruption of the previous recording operation would normally prevent additional data from being recorded on the optical disc, and would lead to difficulties in reproducing the data that have already been recorded. The optical disc apparatus and method according to the invention enable the previous recording on the optical disc to be corrected to a state in which additional data can be recorded on the disc. That is, the apparatus and method according to the invention record additional data on the disc to complete the incomplete recording resulting from the failure of the previous recording operation and to enable additional data to be recorded following the end of the completed previous recording.

Although illustrative embodiments of the invention have been described herein in detail, it is to be understood that the invention is not limited to the precise embodiments described, and that various modifications may be practiced within the scope of the invention defined by the appended claims.

We claim:

1. A method for processing a previous recording of data on a write-once optical disc to enable the previous recording to be read when it is not known whether the previous recording is incomplete and a position of an end of the previous recording is not known, and to enable additional data to be recordable on the write-once optical disc following the previous recording when the previous recording is incomplete, the previous recording, when incomplete, lacking at least an end portion that would be included in the previous recording when complete, the method comprising steps of:

detecting when the previous recording is incomplete; and when the detecting step determines that the previous recording is incomplete:

determining the position of the end of the previous recording, generating a pseudo signal for recording on the write-once optical disc, and writing the pseudo signal generated in the generating step on the write-once optical disc, starting at the position of the end of the previous recording determined by the determining step, to append to the previous recording an additional recording including a replacement for the end portion lacking from the previous recording.

2. A method for processing a previous recording of data on a write-once optical disc to enable the previous recording to be read when the previous recording is incomplete, and to enable additional data to be recordable on the write-once optical disc following the previous recording when the previous recording is incomplete, the previous recording having an end, the end having a position on the write-once optical disc, the previous recording, when incomplete, lacking at least an end portion that would be included in the previous recording when complete, the method comprising steps of:

detecting when the previous recording is incomplete; and when the detecting step determines that the previous recording is incomplete:

determining the position of the end of the previous recording, generating a pseudo signal for recording on the write-once optical disc, and writing the pseudo signal generated in the generating step on the write-once optical disc, starting at the position of the end of the previous recording determined by the determining step, to append to the previous recording an additional recording including a replacement for the end portion lacking from the previous recording;

wherein:

in the previous recording, the data are divided into tracks, the data in each one of the tracks having one of plural data structures, the plural data structures including a defined-length data structure including a defined-length element having a defined length between a head and an end of the element;

the write-once optical disc includes attribute information indicating, for each one of the tracks, the one of the data structures of the data in the one of the tracks, and the length of the defined-length element when the one of the tracks has the defined-length data structure;

the previous recording includes a last track, the last track being the one of the tracks that includes the end of the previous recording; and when the previous recording is incomplete, and the last track has the defined-length data structure, the previous recording lacks part of the defined-length element including the end portion; and wherein:

the method additionally comprises steps of:

reading the attribute information of the last track from the write-once optical disc, determining, from the attribute information read in the reading step, whether the last track has the defined-length data structure, and when the determining step determines that the last track has the defined-length data structure and the detecting step detects that the previous recording is incomplete, calculating a distance between the end of the previous recording and the end of the defined-length element, the distance being calculated from the position of the end of the previous recording and the length of the defined-length element in the attribute information read in the reading step; and in the step of writing the pseudo signal, when the determining step determines that the last track has the defined-length data structure, the pseudo signal is written to append to the previous recording an additional recording having a length equal to the distance calculated in the calculating step, the additional recording including the replacement for the end portion lacking from the previous recording.

3. The method of claim 2, wherein the last track has the defined-length data structure, the defined-length data structure being a track-at-once data structure wherein the defined-length element is the track, and wherein:

in the reading step, attribute information including information indicating the length of the last track is read from the write-once optical disc; and in the calculating step, the distance between the end of the previous recording and the end of the last track is calculated.

4. The method of claim 2, wherein the last track has the defined-length data structure, the defined-length data structure being a fixed-length packet data structure wherein the defined-length element is a fixed-length packet composed of a predetermined number of blocks of the data, the fixed-length packet having an end, and wherein:

in the reading step, attribute information including information indicating the predetermined number of blocks constituting the fixed-length packet is read from the write-once optical disc; and in the calculating step, the distance between the end of the previous recording and the end of the fixed-length packet is calculated.

5. A method for processing a previous recording of data on a write-once optical disc to enable the previous recording to be read when the previous recording is incomplete, and to enable additional data to be recordable on the write-once optical disc following the previous recording when the previous recording is incomplete, the previous recording having an end, the end having a position on the write-once optical disc, the previous recording, when incomplete, lacking at least an end portion that would be included in the previous recording when complete, the method comprising steps of:

detecting when the previous recording is incomplete; and when the detecting step determines that the previous recording is incomplete:

determining the position of the end of the previous recording, generating a pseudo signal for recording on the write-once optical disc, and writing the pseudo signal generated in the generating step on the write-once optical disc, starting at the position of the end of the previous recording determined by the determining step, to append to the previous recording an additional recording including a replacement for the end portion lacking from the previous recording;

wherein:

in the previous recording, the data are divided into tracks, the data in each one of the tracks having one of plural data structures, the plural data structures including a non-defined length data structure lacking any defined-length element having a defined length between a head and an end of the element;

the write-once optical disc includes attribute information indicating, for each one of the tracks, the one of the data structures of the data in the one of the tracks; and the previous recording includes a last track, the last track being the one of the tracks of the previous recording that includes the end of the previous recording; and wherein:

the method additionally comprises steps of:

reading the attribute information of the last track from the write-once optical disc, determining, from the attribute information read in the reading step, whether the last track has the non-defined length data structure and in the step of writing the pseudo signal, when the determining step determines that the last track has the non-defined length data structure, the pseudo signal is written to append to the previous recording the replacement for the end portion lacking from the previous recording, and no more.

6. The method of claim 5, wherein the last track has the data structure lacking any defined-length element, the data structure being a track-at-once data structure wherein the last track has an undefined length, and the data in the last track are divided into plural blocks, and wherein:

in the step of writing the pseudo signal, a portion of the pseudo signal equivalent to two of the blocks is written as the replacement for the end portion lacking from the previous recording.

7. The method of claim 5, wherein the last track has the data structure lacking any defined-length element, the data structure being a variable-length packet structure wherein the last track includes a variable-length packet composed of an arbitrary number of blocks of the data, and wherein:

in the step of writing the pseudo signal, a portion of the pseudo signal equivalent to two of the blocks is written as the replacement for the end portion lacking from the previous recording.

8. A method for processing a previous recording of data on a write-once optical disc to enable the previous recording to be read when the previous recording is incomplete, and to enable additional data to be recordable on the write-once optical disc following the previous recording when the previous recording is incomplete, the previous recording having an end, the end having a position on the write-once optical disc, the previous recording, when incomplete, lacking at least an end portion that would be included in the previous recording when complete, the method comprising steps of:

detecting when the previous recording is incomplete; and when the detecting step determines that the previous recording is incomplete:

determining the position of the end of the previous recording, generating a pseudo signal for recording on the write-once optical disc, and writing the pseudo signal generated in the generating step on the write-once optical disc, starting at the position of the end of the previous recording determined by the determining step, to append to the previous recording an additional recording including a replacement for the end portion lacking from the previous recording;

wherein a recording on the write-once optical disc, when complete, includes a normal end portion, and wherein:

the step of detecting when the previous recording is incomplete includes steps of:

detecting the end of the previous recording;

reproducing data at the end of the previous recording detected in the detecting step;

comparing the data at the end of the previous recording reproduced in the reproducing step with the normal end portion; and when the comparing step determines that the data at the end of the previous recording is different from the normal end portion, indicating that the previous recording is incomplete.

9. The method of claim 8, wherein:

in the previous recording, the data are divided into tracks, the data in each one of the tracks having one of plural data structures;

the write-once optical disc includes attribute information indicating, for each one of the tracks, the one of the data structures of the data in the one of the tracks; and the previous recording includes a last track, the last track being the one of the tracks of the previous recording that includes the end of the previous recording; and wherein:

the step of detecting the end of the previous recording additionally includes steps of:

reading the attribute information from the write-once optical disc, and determining the one of the data structures of the data in the last track from the attribute information read in the reading step.

10. The method of claim 9, wherein the data structures include a packet data structure wherein the data in the track are divided into plural packets, each of the packets having a head; and wherein:

the step of determining the one of the data structures of the data in the last track determines whether the last track has the packet data structure; and when the determining step determines that the last track has a packet data structure, the step of detecting the end of the previous recording additionally includes steps of:

testing each of the packets in the track to locate a last packet, the last packet being the one of the packets that includes the end of the previous recording, and searching for the end of the previous recording beginning at the head of the last packet.

11. The method of claim 10, wherein:

the data structures include a fixed-length packet data structure wherein the data in the track are divided into plural packets, the packets each having a head, the packets each including the same number of blocks of the data; and the attribute information additionally includes a block number indicating the number of blocks of the data in the packets in each of the tracks; and wherein:

the step of determining the one of the data structures of the data in the last track additionally determines whether the last track has the fixed-length packet data structure; and when the determining step determines that the last track has a fixed-length packet data structure, the step of detecting the end of the previous recording additionally includes steps of:

counting the number of blocks in the last packet, extracting the block number for the last track from the attribute information read in the reading step; and when the number of blocks in the last packet counted in the counting step is different from the block number extracted in the extracting step, indicating that the previous recording is incomplete, and omitting the remaining steps.

12. A method for processing a previous recording of data on a write-once optical disc to enable the previous recording to be read when the previous recording is incomplete, and to enable additional data to be recordable on the write-once optical disc following the previous recording when the previous recording is incomplete, the previous recording having an end, the end having a position on the write-once optical disc, the previous recording, when incomplete, lacking at least an end portion that would be included in the previous recording when complete, the method comprising steps of:

detecting when the previous recording is incomplete; and when the detecting step determines that the previous recording is incomplete:

determining the position of the end of the previous recording, generating a pseudo signal for recording on the write-once optical disc, and writing the pseudo signal generated in the generating step on the write-once optical disc, starting at the position of the end of the previous recording determined by the determining step, to append to the previous recording an additional recording including a replacement for the end portion lacking from the previous recording;

wherein:

in the previous recording, the data are divided into tracks, the data in each one of the tracks having one of plural data structures, the plural data structures include a fixed-length data structure including a defined-length element having a defined length between a head and an end of the element; and the write-once optical disc includes attribute information indicating, for each one of the tracks, the one of the data structures of the data in the one of the tracks, and the length of the defined-length element when the one of the tracks has the defined-length data structure; and wherein:

the step of detecting when the previous recording is incomplete includes steps of:

reading the attribute information from the write-once optical disc, deciding from the attribute information read in the reading step whether the data in the last track has the defined-length data structure, and, when the data in the last track has the defined-length data structure:

testing whether the end of the defined-length element is recorded; and when the testing step indicates that the end of the defined-length element is not recorded, indicating that the previous recording is incomplete.

13. The method of claim 12, wherein the attribute information additionally indicates the length of the defined-length element when the one of the tracks has the defined-length data structure; and wherein:

in the testing step, the end of the defined-length element is reproduced from the write-once optical disc in response to the length of the defined-length element included in the attribute information read in the reading step.

14. A method for processing a previous recording of data on a write-once optical disc to enable the previous recording to be read when the previous recording is incomplete, and to enable additional data to be recordable on the write-once optical disc following the previous recording when the previous recording is incomplete, the previous recording having an end, the end having a position on the write-once optical disc, the previous recording, when incomplete, lacking at least an end portion that would be included in the previous recording when complete, the method comprising steps of:

detecting when the previous recording is incomplete; and when the detecting step determines that the previous recording is incomplete:

determining the position of the end of the previous recording, generating a pseudo signal for recording on the write-once optical disc, and writing the pseudo signal generated in the generating step on the write-once optical disc starting at the position of the end of the previous recording determined by the determining step, to append to the previous recording an additional recording including a replacement for the end portion lacking from the previous recording;

wherein the step of determining the position of the end of the previous recording includes steps of:

defining a search interval of a predetermined precision, the search interval having a head and encompassing the end of the previous recording;

determining a position on the write-once optical disc of the head of the search interval;

reproducing the previous recording, starting from the position of the head of the search interval, to provide a reproduction signal; and monitoring the reproduction signal, a cessation of the reproduction signal indicating the position of the end of the recording.

15. The method of claim 14, wherein, the step of determining a position on the write-once optical disc of the head of the search interval is performed using a mid-point search routine.

16. Apparatus for processing a previous recording of data on a write-once optical disc to enable the previous recording to be read when it is not known whether the previous recording is incomplete and a position of an end of the previous recording is not known, and to enable additional data to be recordable on the write-once optical disc following the previous recording when the previous recording is incomplete, the previous recording having an end, the end having a position on the write-once optical disc, the previous recording, when incomplete, lacking at least an end portion that would be included in the previous recording when complete, the apparatus comprising:

incomplete recording detecting means for detecting when the previous recording is incomplete;

recording end position determining means for determining the position of the end of the previous recording;

signal generating means for generating a pseudo signal for recording on the write-once optical disc; and writing means for writing the pseudo signal generated by the signal generating means on the write-once optical disc, the writing means starting writing the pseudo signal at the position of the end of the previous recording determined by the recording end position determining means, to append to the previous recording an additional recording including a replacement for the end portion lacking from the previous recording;

the recording end determining means, the signal generating means and the writing means operating when the incomplete recording detecting means detects that the previous recording is incomplete.

17. Apparatus for processing a previous recording of data on a write-once optical disc to enable the previous recording to be, read when the previous recording is incomplete, and to enable additional data to be recordable on the write-once optical disc following the previous recording when the previous recording is incomplete, the previous recording having an end, the end having a position on the write-once optical disc, the previous recording, when incomplete, lacking at least an end portion that would be included in the previous recording when complete, the apparatus comprising:

incomplete recording detecting means for detecting when the previous recording is incomplete;

recording end position determining means for determining the position of the end of the previous recording;

signal generating means for generating a pseudo signal for recording on the write-once optical disc; and writing means for writing the pseudo signal generated by the signal generating means on the write-once optical disc, the writing means starting writing the pseudo signal at the position of the end of the previous recording determined by the recording end position determining means, to append to the previous recording an additional recording including a replacement for the end portion lacking from the previous recording;

the recording end determining means, the signal generating means and the writing means operating when the incomplete recording detecting means detects that the previous recording is incomplete;

wherein:

in the previous recording, the data are divided into tracks, the data in each one of the tracks having one of plural data structures, the plural data structures including a defined-length data structure including a defined-length element having a defined length between a head and an end of the element;

the write-once optical disc includes attribute information indicating, for each one of the tracks, the one of the data structures of the data in the one of the tracks, and the length of the defined-length element when the one of the tracks has the defined-length data structure;

the previous recording includes a last track, the last track being the one of the tracks that includes the end of the previous recording; and when the previous recording is incomplete, and the last track has the defined-length data structure, the previous recording lacks part of the defined-length element including the end portion; and wherein:

the apparatus additionally comprises:

reading means for reading the attribute information of the last track from the write-once optical disc, data structure determining means, receiving the attribute information read by the reading means, for determining whether the last track has the defined-length data structure, and calculating means, operating when the data structure determining means determines that the last track has the defined-length data structure, and the incomplete recording detecting means detects that the previous recording is incomplete, for calculating a distance between the end of the previous recording and the end of the defined-length element, the distance being calculated from the position of the end of the previous recording determined by the recording end position determining means and the length of the defined-length element in the attribute information read by the reading means; and when the data structure determining means determines that the last track has the defined-length data structure, the writing means writes the pseudo signal to append to the previous recording an additional recording having a length equal to the distance calculated by the calculating means, the additional recording including the replacement for the end portion lacking from the previous recording.

18. The apparatus of claim 17, wherein the last track has the defined-length data structure, the defined-length data structure being a track-at-once data structure wherein the defined-length element is the track, and wherein:

the reading means reads from the write-once optical disc attribute information including information indicating the length of the last track; and the calculating means calculates the distance between the end of the previous recording and the end of the last track.

19. The apparatus of claim 17, wherein the last track has the defined-length data structure, the defined-length data structure being a fixed-length packet data structure wherein the defined-length element is a fixed-length packet composed of a predetermined number of blocks of the data, the fixed-length packet having an end, and wherein:

the reading means reads from the write-once optical disc attribute information including information indicating the predetermined number of blocks constituting the fixed-length packet; and the calculating means calculates the distance between the end of the previous recording and the end of the fixed-length packet.

20. Apparatus for processing a previous recording of data on a write-once optical disc to enable the previous recording to be read when the previous recording is incomplete, and to enable additional data to be recordable on the write-once optical disc following the previous recording when the previous recording is incomplete, the previous recording having an end, the end having a position on the write-once optical disc, the previous recording, when incomplete, lacking at least an end portion that would be included in the previous recording when complete, the apparatus comprising:

incomplete recording detecting means for detecting when the previous recording is incomplete;

recording end position determining means for determining the position of the end of the previous recording;

signal generating means for generating a pseudo signal for recording on the write-once optical disc; and writing means for writing the pseudo signal generated by the signal generating means on the write-once optical disc, the writing means starting writing the pseudo signal at the position of the end of the previous recording determined by the recording end position determining means, to append to the previous recording an additional recording including a replacement for the end portion lacking from the previous recording;

the recording end determining means, the signal generating means and the writing means operating when the incomplete recording detecting means detects that the previous recording is incomplete;

wherein:

in the previous recording, the data are divided into tracks, the data in each one of the tracks having one of plural data structures, the plural data structures including a non-defined length data structure lacking any defined-length element having a defined length between a head and an end of the element;

the write-once optical disc includes attribute information indicating, for each one of the tracks, the one of the data structures of the data in the one of the tracks; and the previous recording includes a last track, the last track being the one of the tracks of the previous recording that includes the end of the previous recording; and wherein:

the apparatus additionally comprises:

reading means for reading the attribute information of the last track from the write-once optical disc, and data structure determining means, receiving the attribute information read by the reading means, for determining whether the last track has the non-defined length data structure, and when the data structure determining means determines that the last track has the non-defined length data structure, the writing means writes the pseudo signal to append to the previous recording the replacement for the end portion lacking from the previous recording, and no more.

21. The apparatus of claim 20, wherein the last track has the data structure lacking any defined-length element, the data structure being a track-at-once data structure wherein the last track has an undefined length, and the data in the last track are divided into plural blocks, and wherein:

the writing means writes a portion of the pseudo signal equivalent to two of the blocks as the replacement for the end portion lacking from the previous recording.

22. The apparatus of claim 20, wherein the last track has the data structure lacking any defined-length element, the data structure being a variable-length packet structure wherein the last track includes a variable-length packet composed of an arbitrary number of blocks of the data, and wherein:

the writing means writes a portion of the pseudo signal equivalent to two of the blocks as the replacement for the end portion lacking from the previous recording.

23. Apparatus for processing a previous recording of data on a write-once optical disc to enable the previous recording to be read when the previous recording is incomplete, and to enable additional data to be recordable on the write-once optical disc following the previous recording when the previous recording is incomplete, the previous recording having an end, the end having a position on the write-once optical disc, the previous recording, when incomplete, lacking at least an end portion that would be included in the previous recording when complete, the apparatus comprising:

incomplete recording detecting means for detecting when the previous recording is incomplete;

recording end position determining means for determining the position of the end of the previous recording;

signal generating means for generating a pseudo signal for recording on the write-once optical disc; and writing means for writing the pseudo signal generated by the signal generating means on the write-once optical disc, the writing means starting writing the pseudo signal at the position of the end of the previous recording determined by the recording end position determining means, to append to the previous recording an additional recording including a replacement for the end portion lacking from the previous recording;

the recording end determining means, the signal generating means and the writing means operating when the incomplete recording detecting means detects that the previous recording is incomplete;

wherein a recording on the write-once optical disc, when complete, includes a normal end portion, and wherein:

the incomplete recording detecting means includes recording end detecting means for detecting the end of the previous recording;

the apparatus additionally includes reading means for reproducing data at the end of the previous recording detected by the recording end detecting means; and the incomplete recording detecting means additionally includes:

comparator means for comparing the data at the end of the previous recording from the reading means with the normal end portion, and means for indicating that the previous recording is incomplete when the comparator means determines that the data at the end of the previous recording is different from the normal end portion.

24. The apparatus of claim 23, wherein:

in the previous recording, the data are divided into tracks, the data in each one of the tracks having one of plural data structures;

the write-once optical disc includes attribute information indicating, for each one of the tracks, the one of the data structures of the data in the one of the tracks; and the previous recording includes a last track, the last track being the one of the tracks of the previous recording that includes the end of the previous recording; and wherein:

the reading means is additionally for reading the attribute information from the write-once optical disc; and the recording end detecting means additionally includes data structure determining means, receiving the attribute information read by the reading means, for determining the one of the data structures of the data in the last track.

25. The apparatus of claim 24, wherein the data structures include a packet data structure wherein the data in the track are divided into plural packets, each of the packets having a head; and wherein:

the data structure determining means is additionally for determining whether the last track has the packet data structure; and the recording end detecting means additionally includes:
testing means for testing each of the packets in the track to locate a last packet, the last packet being the one of the packets that includes the end of the previous recording, and searching means for searching for the end of the previous recording beginning at the head of the last packet, the testing means and the searching means operating when the data structure determining means determines that the last track has a packet data structure.

26. The apparatus of claim 25, wherein:

the data structures include a fixed-length packet data structure wherein the data in the track are divided into plural packets, the packets each having a head, the packets each including the same number of blocks of the data; and the attribute information additionally includes a block number indicating the number of blocks of the data in the packets in each of the tracks; and wherein:

the data structure determining means is additionally for determining whether the last track has the fixed-length packet data structure; and the recording end detecting means additionally includes:
counting means for counting the number of blocks in the last packet, block number extracting means, receiving the attribute information from the reading means, for extracting the block number for the last track from the attribute information, and incomplete recording indicating means for indicating that the previous recording is incomplete when the number of blocks in the last packet counted by the counting means is different from the block number extracted by the extracting means, the counting means, the block number extracting means, and the incomplete recording indicating means operating when the data structure determining means determines that the last track has a fixed-length packet data structure.

27. Apparatus for processing a previous recording of data on a write-once optical disc to enable the previous recording to be read when the previous recording is incomplete, and to enable additional data to be recordable on the write-once optical disc following the previous recording when the previous recording is incomplete, the previous recording having an end, the end having a position on the write-once optical disc, the previous recording, when incomplete, lacking at least an end portion that would be included in the previous recording when complete, the apparatus comprising:

incomplete recording detecting means for detecting when the previous recording is incomplete;

recording end position determining means for determining the position of the end of the previous recording;

signal generating means for generating a pseudo signal for recording on the write-once optical disc; and writing means for writing the pseudo signal generated by the signal generating means on the write-once optical disc, the writing means starting writing the pseudo signal at the position of the end of the previous recording determined by the recording end position determining means, to append to the previous recording an additional recording including a replacement for the end portion lacking from the previous recording;

the recording end determining means, the signal generating means and the writing means operating when the incomplete recording detecting means detects that the previous recording is incomplete;

wherein:

in the previous recording, the data are divided into tracks, the data in each one of the tracks having one of plural data structures, the plural data structures include a fixed-length data structure including a defined-length element having a defined length between a head and an end of the element; and the write-once optical disc includes attribute information indicating, for each one of the tracks, the one of the data structures of the data in the one of the tracks, and the length of the defined-length element when the one of the tracks has the defined-length data structure; and wherein:

the apparatus additionally includes reading means for reading the attribute information from the write-once optical disc;

the incomplete recording detecting means includes:
data structure determining means, receiving the attribute information read by the reading means, for determining whether the data in the last track has the defined-length data structure, testing means for testing whether the end of the defined-length element is recorded, and incomplete recording indicating means for indicating that the previous recording is incomplete when the testing means indicates that the end of the defined-length element is not recorded, the testing means and the incomplete recording means indicating means operating when the data structure determining means determines that the data in the last track has the defined-length data structure.

28. The apparatus of claim 27, wherein the attribute information additionally indicates the length of the defined-length element when the one of the tracks has the defined-length data structure; and wherein:

the reading means is additionally for reading the end of the defined-length element from the write-once optical disc, and the apparatus additionally includes means, receiving the attribute information read by the reading means, for extracting the length of the length-defined element from the attribute information, and for feeding the length of the defined-length element to the reading means.

29. Apparatus for processing a previous recording of data on a write-once optical disc to enable the previous recording to be read when the previous recording is incomplete, and to enable additional data to be recordable on the write-once optical disc following the previous recording when the previous recording is incomplete, the previous recording having an end, the end having a position on the write-once optical disc, the previous recording, when incomplete, lacking at least an end portion that would be included in the previous recording when complete, the apparatus comprising:

incomplete recording detecting means for detecting when the previous recording is incomplete;

recording end position determining means for determining the position of the end of the previous recording;

signal generating means for generating a pseudo signal for recording on the write-once optical disc; and writing means for writing the pseudo signal generated by the signal generating means on the write-once optical disc, the writing means starting writing the pseudo signal at the position of the end of the previous recording determined by the recording end position determining means, to append to the previous recording an additional recording including a replacement for the end portion lacking from the previous recording;

the recording end determining means, the signal generating means and the writing means operating when the incomplete recording detecting means detects that the previous recording is incomplete; wherein:

the apparatus additionally includes reading means for reading the previous recording from the write-once optical disc to provide a reproduction signal;

the recording end position determining means includes:

search interval defining means for defining a search interval of a predetermined precision, the search interval having a head and encompassing the end of the previous recording, and search interval head position determining means for determining a position on the write-once optical disc of the head of the search interval, means for receiving the position of the head of the search interval from the search interval head position determining means and for causing the reading means to read the previous recording, starting from the position of the head of the search interval, and means for monitoring the reproduction signal from the reading means and for indicating the position of the end of the recording in response to a cessation of the reproduction signal at the end of the recording.

30. The apparatus of claim 29, wherein, the search interval head position determining means includes means for performing a mid-point search routine to determine the position of the head of the search interval.

* * * * *